(12) United States Patent
Yonemoto et al.

(10) Patent No.: US 9,264,609 B2
(45) Date of Patent: Feb. 16, 2016

(54) IMAGE PROCESSING APPARATUS USING OVERLAP WIDTH DATA

(71) Applicant: OLYMPUS CORPORATION, Tokyo (JP)

(72) Inventors: Tomonori Yonemoto, Yokohama (JP); Hideru Ikeda, Tokyo (JP); Keisuke Nakazono, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/224,179

(22) Filed: Mar. 25, 2014

(65) Prior Publication Data

US 2014/0293090 A1 Oct. 2, 2014

(30) Foreign Application Priority Data

Mar. 28, 2013 (JP) ................................. 2013-070597

(51) Int. Cl.
*H04N 5/228* (2006.01)
*H04N 5/232* (2006.01)
*H04N 5/235* (2006.01)

(52) U.S. Cl.
CPC ....... *H04N 5/23229* (2013.01); *H04N 5/23245* (2013.01)

(58) Field of Classification Search
CPC .......... H04N 5/23229; H04N 5/23232; H04N 5/23235; H04N 3/155
USPC ......... 348/222.1, 229.1–230.1; 382/232–233, 382/236, 238–240, 250–251
See application file for complete search history.

(56) References Cited

U.S. PATENT DOCUMENTS

| | | | |
|---|---|---|---|
| 2005/0117029 A1* | 6/2005 | Shiomi | 348/222.1 |
| 2010/0260428 A1* | 10/2010 | Ueno et al. | 382/232 |
| 2011/0134489 A1* | 6/2011 | Suzuki | 358/448 |
| 2012/0110224 A1* | 5/2012 | Tanaka et al. | 710/57 |
| 2013/0321678 A1* | 12/2013 | Cote et al. | 348/251 |

FOREIGN PATENT DOCUMENTS

| | | | |
|---|---|---|---|
| JP | 2006-311347 A | 11/2006 |
| JP | 2010-278532 A | 12/2010 |

* cited by examiner

*Primary Examiner* — Kelly L Jerabek
(74) *Attorney, Agent, or Firm* — Westerman, Hattori, Daniels & Adrian, LLP

(57) ABSTRACT

An image processing apparatus includes: an image processing section that receives input images of a plurality of frames, divides an image of each input frame into a plurality of blocks for each image of the frame, and generates an image corresponding to each frame by performing predetermined image processing on each division block; and an overlap width control section that separately saves overlap width data to be used in each of a plurality of image processing operations by the image processing section for generating the image corresponding to each frame for each piece of the overlap width data corresponding to each image processing operation when image data included in an overlap width area in which block areas overlap within the image of each frame is saved as overlap width data, and switches the overlap width data to be used when the image processing section performs each image processing operation.

14 Claims, 16 Drawing Sheets

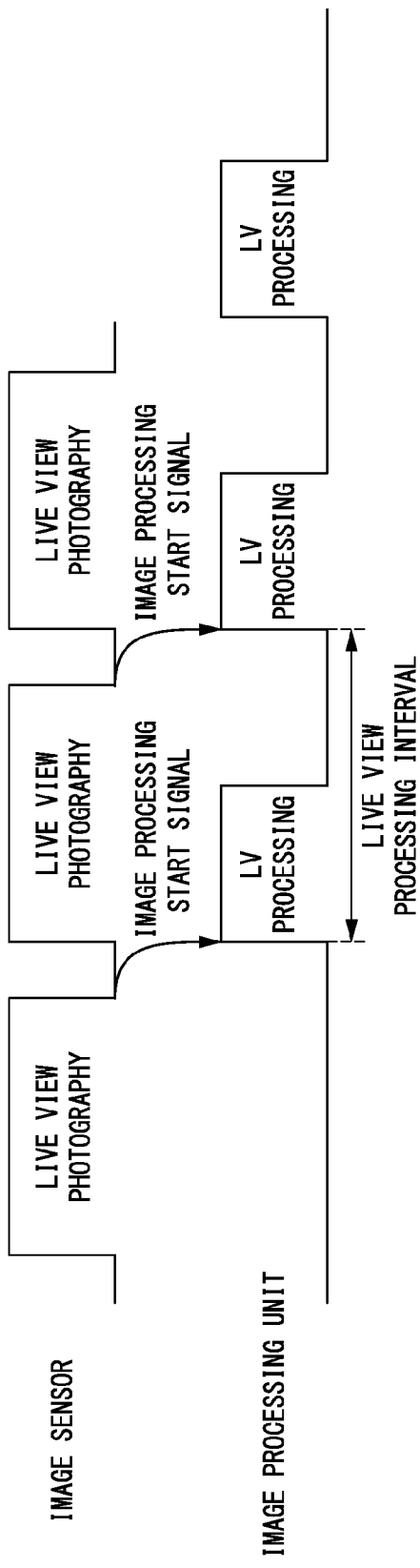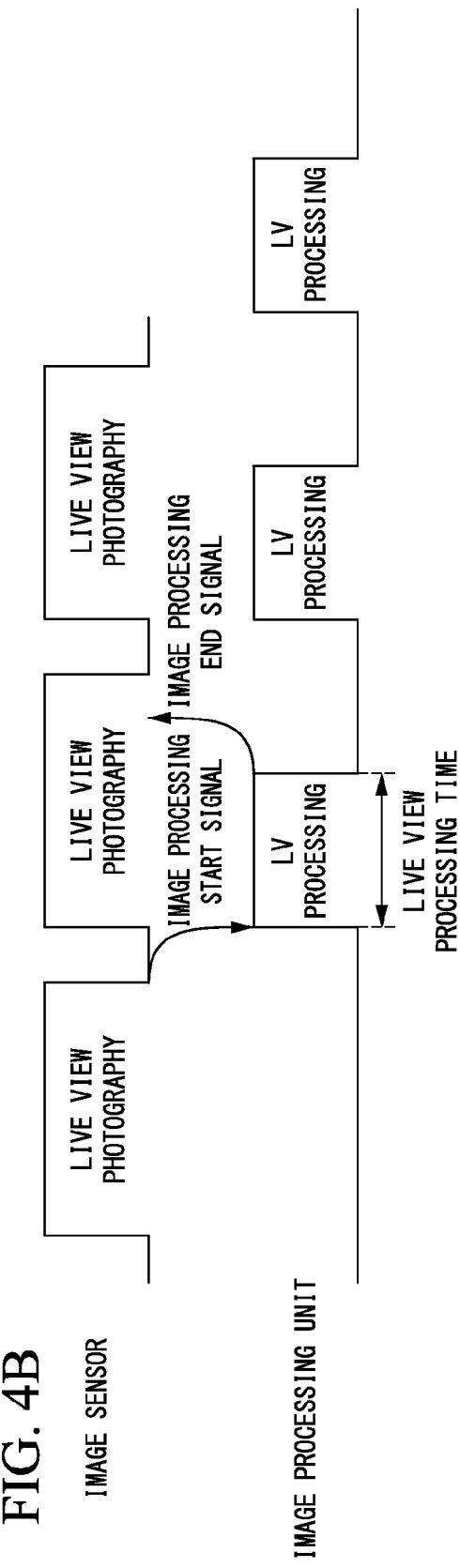

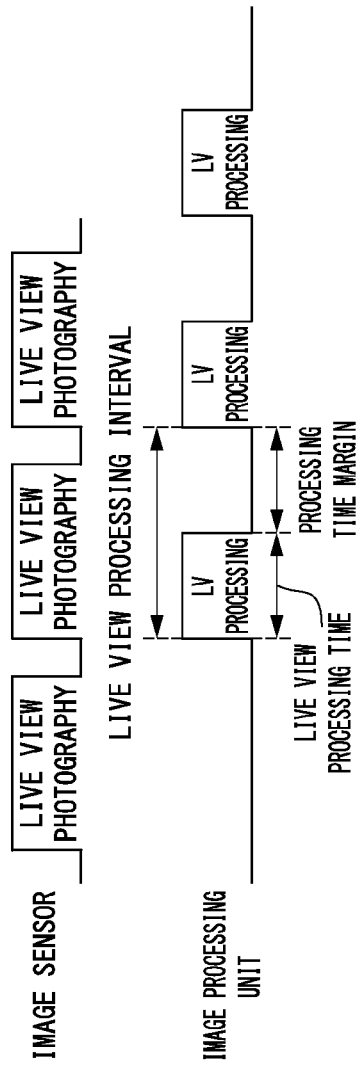

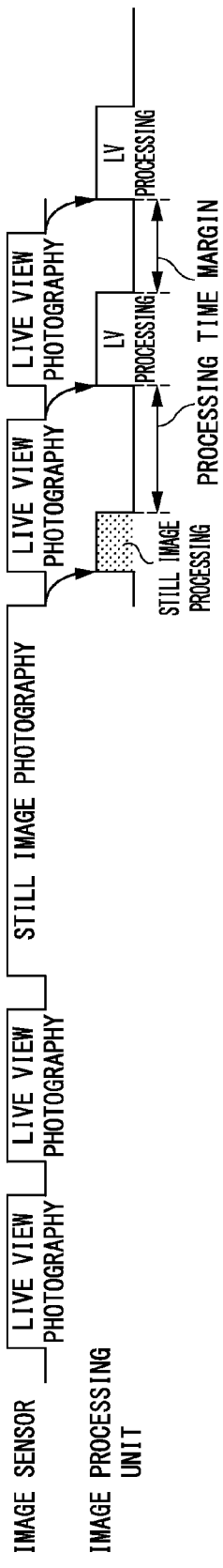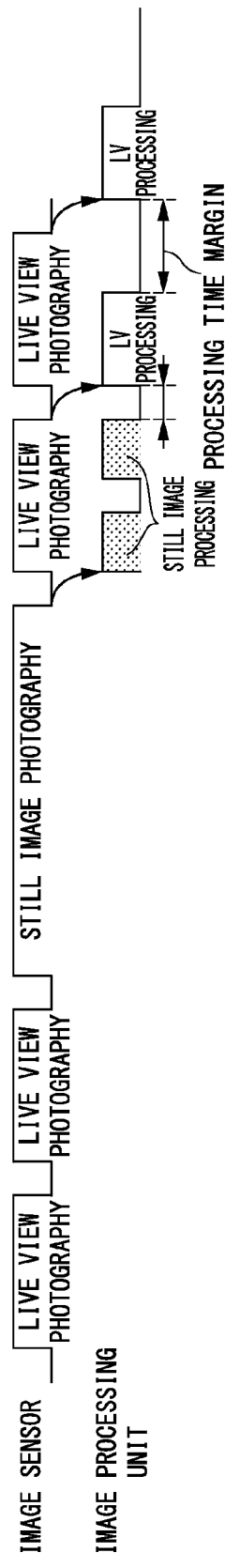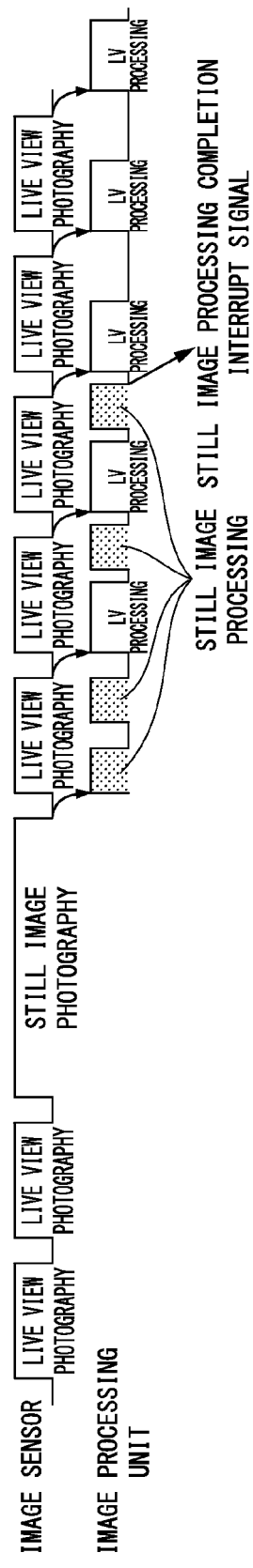

FIG. 14

| STILL IMAGE PROCESSING 1 | STILL IMAGE PROCESSING 5 | STILL IMAGE PROCESSING 9 | STILL IMAGE PROCESSING 13 |
|---|---|---|---|
| STILL IMAGE PROCESSING 2 | STILL IMAGE PROCESSING 6 | STILL IMAGE PROCESSING 10 | STILL IMAGE PROCESSING 14 |
| STILL IMAGE PROCESSING 3 | STILL IMAGE PROCESSING 7 | STILL IMAGE PROCESSING 11 | STILL IMAGE PROCESSING 15 |
| STILL IMAGE PROCESSING 4 | STILL IMAGE PROCESSING 8 | STILL IMAGE PROCESSING 12 | STILL IMAGE PROCESSING 16 |

FIG. 16A --Prior Art--
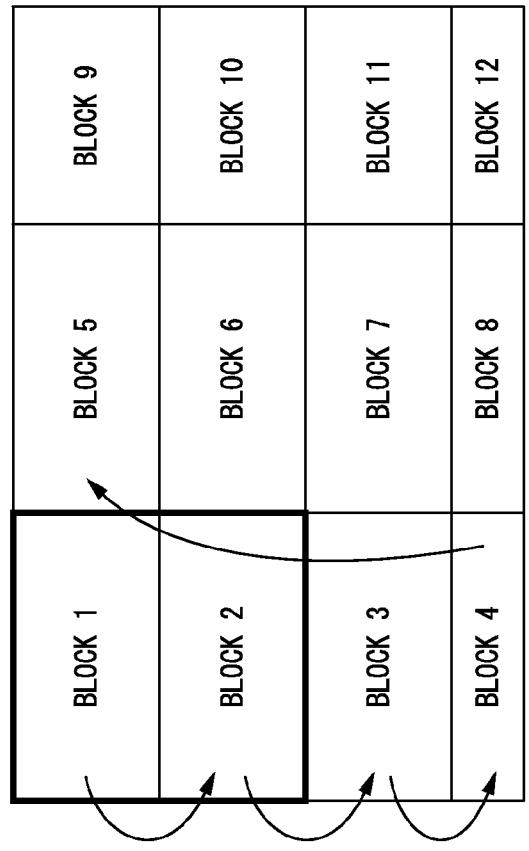
FIG. 16B --Prior Art--
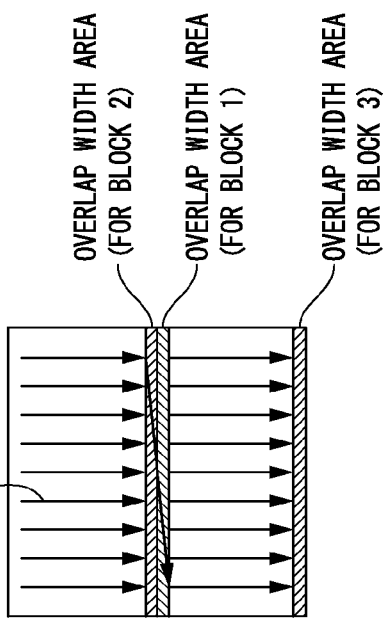

IMAGE PROCESSING APPARATUS USING OVERLAP WIDTH DATA

BACKGROUND OF THE INVENTION

1. Field of the Invention

The present invention relates to an image processing apparatus.

Priority is claimed on Japanese Patent Application No. 2013-070597, filed Mar. 28, 2013, the content of which is incorporated herein by reference.

2. Description of the Related Art

In recent years, the reduction of a processing time necessary for image processing, for example, has been required to cope with high-definition moving images such as full high-vision moving images in an imaging apparatus such as a digital camera or a digital video camera. As one method according to this requirement, for example, Japanese Unexamined Patent Application, First Publication No. 2010-278532 (hereinafter referred to as Patent Literature 1) discloses a method of dividing an image of one frame into a plurality of blocks and performing imaging processing on each division block (see FIGS. 16A and 16B).

Although a flow of image data to be processed within each division block is continuous when the image of one frame is divided into a plurality of blocks as illustrated in FIG. 16A, a flow of image data between different blocks is not continuous (see FIG. 16B). Thus, when a spatial filtering process is performed in image processing on each block, a so-called "overlap width area," which is an overlap area of image data, is necessary. Likewise, the image processing apparatus also acquires image data of the overlap width area in addition to image data of a block on which the image processing is performed, thereby performing the image processing in a status in which the image data of the block and the image data of the overlap width area are combined.

In the image processing apparatus, a time taken to acquire the image data of the overlap width area is a factor that interferes with the reduction of a processing time. In technology disclosed in Patent Literature 1, by providing an overlap width saving buffer which saves image data of the overlap width area within the image processing apparatus, the time taken to acquire the image data of the overlap width area for use in the image processing is shortened and the improvement of processing capability for an image is implemented.

In addition, the imaging apparatus is equipped with a so-called live view function of displaying a moving image for viewing a subject to be photographed on a display device mounted on the imaging apparatus. In the live view function, pixel signals of frames are continuously acquired from an image sensor according to live view photography, and the image processing apparatus generates an image (hereinafter referred to as a live view image) of each frame to be displayed on the display device and sequentially displays a live view image of each frame.

In this imaging apparatus, it is also possible to capture a still image while the live view image of each frame is displayed on the display device by the live view function. At this time, the image sensor provided in the imaging apparatus performs switching from the live view photography to still image photography for acquiring a pixel signal of a still image at the timing at which the still image is captured. Then, after the still image has been generated from the pixel signal acquired according to the still image photography, the image processing apparatus performs switching to the live view photography again.

Thus, during a period in which the image sensor performs the still image photography and a period in which the image processing apparatus performs image processing to generate a still image in the imaging apparatus of the related art, it is difficult to perform the live view photography and the imaging apparatus of the related art is in a freeze status in which the live view image displayed on the display device is fixed to the same image or a blackout status in which no live view image is displayed and a black display is made. This is because it is difficult for the image sensor to perform the live view photography during a period in which the still image photography is performed and it is difficult for the image processing apparatus to perform image processing for generating a live view image during a period in which image processing is performed to generate a still image.

In the imaging apparatus, it is desirable to restore (resume) a display of a live view image at an early timing in order to prevent a so-called photo opportunity, which is the timing at which the next still image is captured, from being missed. Patent Literature 1 discloses a configuration in which a plurality of image processing apparatuses are provided within the imaging apparatus and respective image processing sections perform different image processing operations. In the configuration disclosed in Patent Literature 1, it is possible to promptly restore a display of the display device from the freeze status or the blackout status by simultaneously performing image processing for generating a live view image and image processing for generating a still image in parallel in different image processing apparatuses.

Japanese Unexamined Patent Application, First Publication No. 2006-311347 (hereinafter referred to as Patent Literature 2) discloses a method of dividing image processing for generating a still image and performing still image processing of each division during a period in which image processing for generating a live view image is not performed. In technology disclosed in Patent Literature 2, by dividing the still image processing and the image process for generating the live view image according to time division, it is possible to promptly restore a display of the display device from the freeze status or the blackout status even in one image processing apparatus.

SUMMARY

According to a first aspect of the present invention, there is provided an image processing apparatus including: an image processing section configured to receive input images of a plurality of frames, divide an image of each input frame into a plurality of blocks for each image of the frame, and generate an image corresponding to each frame by performing predetermined image processing on each division block; and an overlap width control section configured to separately save overlap width data to be used in each of a plurality of image processing operations by the image processing section for generating the image corresponding to each frame for each piece of the overlap width data corresponding to each image processing operation when image data included in an overlap width area in which block areas overlap within the image of each frame is saved as overlap width data, and switch the overlap width data to be used when the image processing section performs each image processing operation.

According to a second aspect of the present invention, in the image processing apparatus according to the first aspect, the overlap width control section may separately save first overlap width data for use in first image processing by the image processing section for generating a first image corresponding to the image of each frame and second overlap width data for use in second image processing by the image processing section for generating a second image corresponding to an image of each frame, and switch the overlap width data to be used when the image processing section performs each image processing operation to either the first overlap width data or the second overlap width data.

According to a third aspect of the present invention, in the image processing apparatus according to the second aspect, the overlap width control section may include: a first overlap width saving section configured to save the first overlap width data; a second overlap width saving section configured to save the second overlap width data; and a sequencer configured to switch a saving destination of the overlap width data to either the first overlap width saving section or the second overlap width saving section and switch an output source of the overlap width data to be output to the image processing section to either the first overlap width saving section or the second overlap width saving section, the sequencer may switch the saving destination and the output source of the overlap width data to the first overlap width saving section when the image processing section performs the first image processing, and the sequencer may switch the saving destination and the output source of the overlap width data to the second overlap width saving section when the image processing section performs the second image processing.

According to a fourth aspect of the present invention, in the image processing apparatus according to the third aspect, the sequencer may include: a first processing time calculating section configured to calculate an image processing interval which is an interval at which the image processing section performs the first image processing on the image of each frame and an image processing time which is a time in which the image processing section performs the first image processing on the image of one frame; a second processing time calculating section configured to calculate an image processing time margin which is a time in which the image processing section is able to perform the second image processing based on the image processing interval and the image processing time and further calculate a block processing time which is a time in which the image processing section performs the second image processing on one block generated by dividing the image of one frame; a processing block size determining section configured to determine a block size in which the image processing section is able to perform the second image processing on at least one block within the image processing time margin based on the image processing time margin and the block processing time; and a processing switching determining section configured to switch the saving destination and the output source of the overlap width data based on the image processing time margin, the block processing time, and information representing a status of the second image processing by the image processing section.

According to a fifth aspect of the present invention, in the image processing apparatus according to the second aspect, the overlap width control section may include: an overlap width saving section configured to separately save the first overlap width data and the second overlap width data in different storage areas; and a sequencer configured to divide the storage area of the overlap width saving section into a first storage area in which the first overlap width data is saved and a second storage area in which the second overlap width data is saved, and control switching of the overlap width data to be used when the image processing section performs the image processing, the sequencer may dynamically determine sizes of the first storage area and the second storage area within the overlap width saving section according to each image processing operation to be performed by the image processing section and divide the storage area into the first storage area and the second storage area based on the determined size of each storage area, and the sequencer may control switching of the overlap width data so that the first overlap width data saved in the first storage area is used when the image processing section performs the first image processing and the second overlap width data saved in the second storage area is used when the image processing section performs the second image processing.

According to a sixth aspect of the present invention, in the image processing apparatus according to the fifth aspect, the sequencer may include: a first processing time calculating section configured to calculate an image processing interval which is an interval at which the image processing section performs the first image processing on the image of each frame and an image processing time which is a time in which the image processing section performs the first image processing on the image of one frame; a second processing time calculating section configured to calculate an image processing time margin which is a time in which the image processing section is able to perform the second image processing based on the image processing interval and the image processing time and further calculate a block processing time which is a time in which the image processing section performs the second image processing on one block generated by dividing the image of one frame; a processing block size determining section configured to determine a block size in which the image processing section is able to perform the second image processing on at least one block within the image processing time margin based on the image processing time margin and the block processing time; a processing switching determining section configured to control switching of the overlap width data to be used when the image processing section performs the image processing based on the image processing time margin, the block processing time, and information representing a status of the second image processing by the image processing section; an image processing completion determining section configured to determine completion of the second image processing for the image of one frame based on the image processing time margin, the block processing time, and the information representing the status of the second image processing by the image processing section; and a division width determining section configured to determine a division width in which the storage area of the overlap width saving section is divided into the first storage area and the second storage area based on a determination result of the completion of the second image processing by the image processing completion determining section, the image processing time margin, and the block processing time.

According to a seventh aspect of the present invention, in the image processing apparatus according to any one of the second to sixth aspects, the first image processing may be image processing for a moving image display in which image data for displaying a moving image according to image data of each input frame on a display apparatus is generated, and the second image processing may be image processing for still image recording in which image data for recording a still image according to image data of the input frame is generated.

According to an eighth aspect of the present invention, in the image processing apparatus according to any one of the second to seventh aspects, each of the first image processing and the second image processing may be a spatial filtering process on image data of each input frame.

According to a ninth aspect of the present invention, there is provided an image processing apparatus including: an image processing section configured to receive input images of a plurality of frames, divide an image of each input frame into a plurality of blocks for each image of the frame, and generate an image corresponding to each frame by performing predetermined image processing on each division block; an overlap width saving section configured to set image data included in an overlap width area in which block areas overlap within the image of each frame as overlap width data and separately save overlap width data to be used in each of a plurality of image processing operations by the image processing section for generating the image corresponding to each frame for each piece of the overlap width data corresponding to each image processing operation; and a sequencer configured to switch the overlap width data to be used when the image processing section performs each image processing operation.

According to a tenth aspect of the present invention, in the image processing apparatus according to the ninth aspect, the overlap width saving section may separately save first overlap width data for use in first image processing by the image processing section for generating a first image corresponding to the image of each frame and second overlap width data for use in second image processing by the image processing section for generating a second image corresponding to the image of each frame, and the sequencer may switch the overlap width data saved in the overlap width saving section output to the image processing section when the image processing section performs each image processing operation to either the first overlap width data or the second overlap width data.

According to an eleventh aspect of the present invention, in the image processing apparatus according to the tenth aspect, the overlap width saving section may include: a first overlap width saving section configured to save the first overlap width data; and a second overlap width saving section configured to save the second overlap width data, the sequencer may switch a saving destination and an output source of the overlap width data to the first overlap width saving section when the image processing section performs the first image processing, and the sequencer may switch the saving destination and the output source of the overlap width data to the second overlap width saving section when the image processing section performs the second image processing.

According to a twelfth aspect of the present invention, in the image processing apparatus according to the eleventh aspect, the sequencer may include: a first processing time calculating section configured to calculate an image processing interval which is an interval at which the image processing section performs the first image processing on the image of each frame and an image processing time which is a time in which the image processing section performs the first image processing on the image of one frame; a second processing time calculating section configured to calculate an image processing time margin which is a time in which the image processing section is able to perform the second image processing based on the image processing interval and the image processing time and further calculate a block processing time which is a time in which the image processing section performs the second image processing on one block generated by dividing the image of one frame; a processing block size determining section configured to determine a block size in which the image processing section is able to perform the second image processing on at least one block within the image processing time margin based on the image processing time margin and the block processing time; and a processing switching determining section configured to switch the saving destination and the output source of the overlap width data based on the image processing time margin, the block processing time, and information representing a status of the second image processing by the image processing section.

According to a thirteenth aspect of the present invention, in the image processing apparatus according to the tenth aspect, an overlap width saving section may separately save the first overlap width data and the second overlap width data in different storage areas, the sequencer may dynamically determine sizes of a first storage area in which the first overlap width data within the overlap width saving section is saved and a second storage area in which the second overlap width data is saved according to each image processing operation to be performed by the image processing section and divide the storage area into the first storage area and the second storage area based on the determined size of each storage area, and the sequencer may control switching of the overlap width data so that the first overlap width data saved in the first storage area is used when the image processing section performs the first image processing and the second overlap width data saved in the second storage area is used when the image processing section performs the second image processing.

According to a fourteenth aspect of the present invention, in the image processing apparatus according to the thirteenth aspect, the sequencer may include: a first processing time calculating section configured to calculate an image processing interval which is an interval at which the image processing section performs the first image processing on the image of each frame and an image processing time which is a time in which the image processing section performs the first image processing on the image of one frame; a second processing time calculating section configured to calculate an image processing time margin which is a time in which the image processing section is able to perform the second image processing based on the image processing interval and the image processing time and further calculate a block processing time which is a time in which the image processing section performs the second image processing on one block generated by dividing the image of one frame; a processing block size determining section configured to determine a block size in which the image processing section is able to perform the second image processing on at least one block within the image processing time margin based on the image processing time margin and the block processing time; a processing switching determining section configured to control switching of the overlap width data to be used when the image processing section performs the image processing based on the image processing time margin, the block processing time, and information representing a status of the second image processing by the image processing section; an image processing completion determining section configured to determine completion of the second image processing for the image of one frame based on the image processing time margin, the block processing time, and the information representing the status of the second image processing by the image processing section; and a division width determining section configured to determine a division width in which the storage area of the overlap width saving section is divided into the first storage area and the second storage area based on a determination result of the completion of the second image processing by the image processing completion determining section, the image processing time margin, and the block processing time.

According to a fifteenth aspect of the present invention, in the image processing apparatus according to any one of the tenth to fourteenth aspects, the first image processing may be image processing for a moving image display in which image data for displaying a moving image according to image data of each input frame on a display apparatus is generated, and the second image processing may be image processing for still image recording in which image data for recording a still image according to image data of the input frame is generated.

According to a sixteenth aspect of the present invention, in the image processing apparatus according to any one of the tenth to fifteenth aspects, each of the first image processing and the second image processing may be a spatial filtering process on image data of each input frame.

BRIEF DESCRIPTION OF THE DRAWINGS

FIGS. 4A and 4B are timing charts each illustrating a method of calculating a processing time using the sequencer provided in the image processing apparatus of this first embodiment.

FIGS. 5A and 5B are timing charts each illustrating the method of calculating the processing time using the sequencer provided in the image processing apparatus of this first embodiment.

FIGS. 7A, 7B, and 7C are timing charts each illustrating the method of calculating the processing time using the sequencer provided in the image processing apparatus of this first embodiment.

FIG. 14 is a diagram illustrating a modified example of the size of the saving area of the overlap width data set by the sequencer provided in the image processing apparatus of this second embodiment.

FIGS. 16A and 16B are diagrams each illustrating a block dividing method in an image processing apparatus of the related art.

DETAILED DESCRIPTION OF THE PREFERRED EMBODIMENTS

First Embodiment

Figure 1:
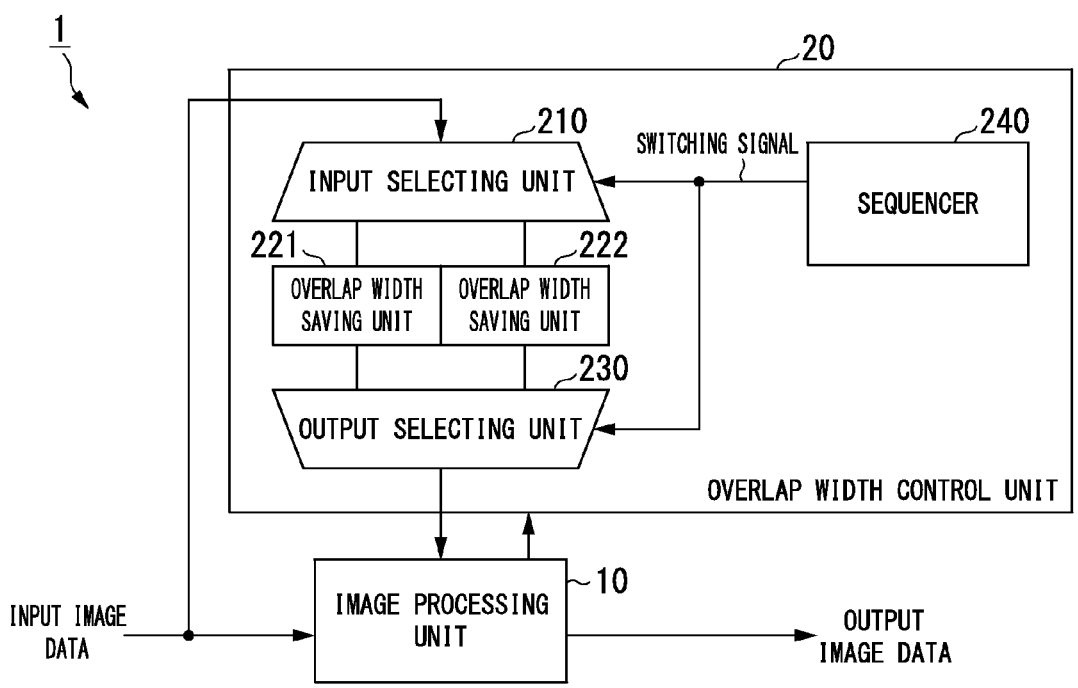
FIG. 1 is a block diagram illustrating a schematic configuration of an image processing apparatus in a first embodiment of the present invention.

Hereinafter, embodiments of the present invention will be described with reference to the drawings. FIG. 1 is a block diagram illustrating a schematic configuration of an image processing apparatus in this first embodiment. The image processing apparatus 1 illustrated in FIG. 1 includes an image processing section 10 and an overlap width control section 20. The image processing apparatus 1 performs various predetermined image processing on input image data which has been input and outputs output image data after the image processing. In the image processing apparatus, an image of one frame is divided into a plurality of blocks and image processing is performed on each division block. When the image processing apparatus 1 performs a spatial filtering process such as a noise cancellation process or a low pass filtering process, the image processing is also performed using image data of a so-called "overlap width area" which is an overlap area of image data necessary for the spatial filtering process in addition to image data of a block on which the image processing is performed. In the following description, the image processing apparatus 1 will be described as an image processing apparatus which performs the spatial filtering process.

The image processing section 10 is an image processing section which performs the spatial filtering process on input image data input to the image processing apparatus 1. The image processing section 10 outputs image data after the spatial filtering process has been performed as output image data after the image processing apparatus 1 has performed the spatial filtering process. In the spatial filtering process by the image processing section 10, processing of each block is performed in a status in which the input image data which has been input is combined with image data (hereinafter referred to as "overlap width data") of an overlap width area input from the overlap width control section 20. In addition, the image processing section 10 outputs signals representing a start and an end of the spatial filtering process or information representing a status of the spatial filtering process to the overlap width control section 20.

In the following description, the case in which the image processing section 10 performs a spatial filtering process (hereinafter referred to as "live view processing") for generating a moving image such as a live view image and a spatial filtering process (hereinafter referred to as "still image processing") for generating a still image will be described.

The overlap width control section 20 temporarily stores overlap width data to be used when the image processing section 10 performs the spatial filtering process and outputs the stored overlap width data to the image processing section 10. The overlap width control section 20 includes an input selecting section 210, two overlap width saving sections 221 and 222, an output selecting section 230, and a sequencer 240.

According to a switching signal input from the sequencer 240, the input selecting section 210 selects image data of an overlap width area to be used when the image processing section 10 performs the spatial filtering process among the input image data input to the image processing apparatus 1 as overlap width data, and outputs the selected overlap width data to either the overlap width saving section 221 or the overlap width saving section 222.

Each of the overlap width saving sections 221 and 222 is a storage section including, for example, a static random access memory (SRAM) or the like, which temporarily stores (saves) the overlap width data input from the input selecting section 210. Each of the overlap width saving sections 221 and 222 has a storage capacity capable of saving overlap width data necessary in one block on which the image processing section 10 performs the spatial filtering process. Then, the use of each of the overlap width saving sections 221 and 222 is divided for saving overlap width data for use in the live view processing by the image processing section 10 and for saving overlap width data for use in the still image processing. In the following description, the case in which the use of the overlap width saving section 221 is divided for saving overlap width data for use in the live view processing and the use of the overlap width saving section 222 is divided for saving overlap width data for use in the still image processing will be described.

According to a switching signal input from the sequencer 240, the output selecting section 230 selects overlap width data of either of the overlap width saving sections 221 and 222 to be used when the image processing section 10 performs the spatial filtering process within saved overlap width data of the overlap width saving section 221 or 222, and outputs the selected overlap width data to the image processing section 10.

The sequencer 240 calculates a processing time when the image processing section 10 performs the spatial filtering process based on the signals representing the start and the end of the spatial filtering process input from the image processing section 10. In addition, the sequencer 240 switches the overlap width saving section which saves the input image data input to the image processing apparatus 1 as the overlap width data based on each calculated time of processing by the image processing section 10 and the information representing the status of the spatial filtering process input from the image processing section 10. Also, details related to a configuration of the sequencer 240 and a method by which the sequencer 240 performs switching to the overlap width saving section of a saving destination of the overlap width data will be described later.

Figure 2A:
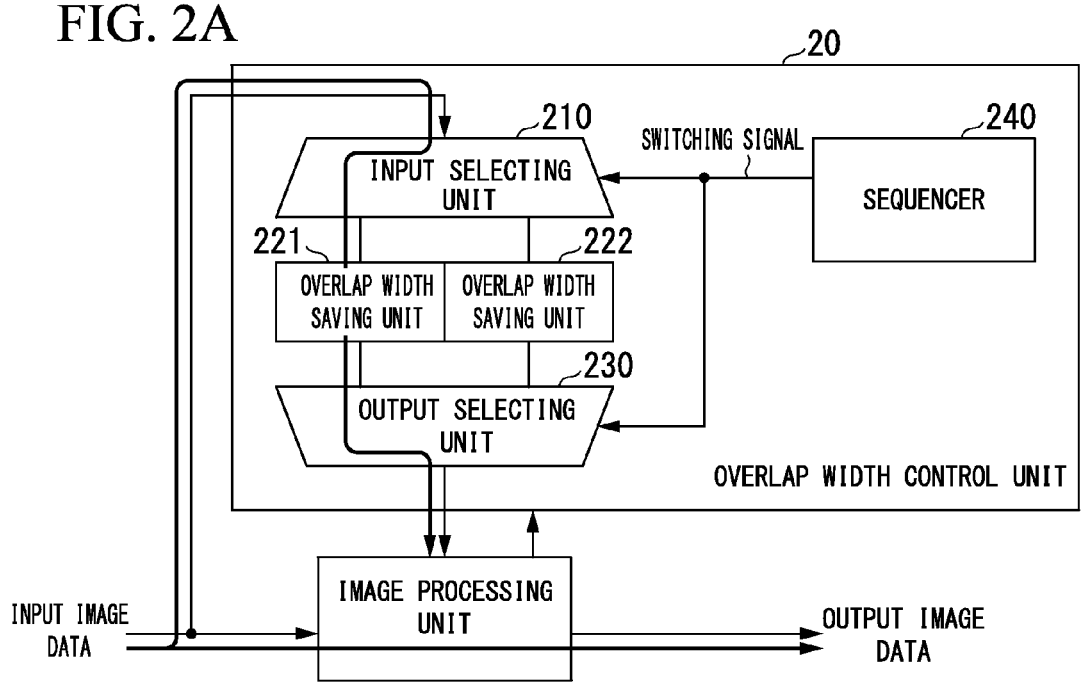
FIGS. 2A and 2B are diagrams each illustrating a flow of image data in the image processing apparatus of this first embodiment.
Figure 2B:
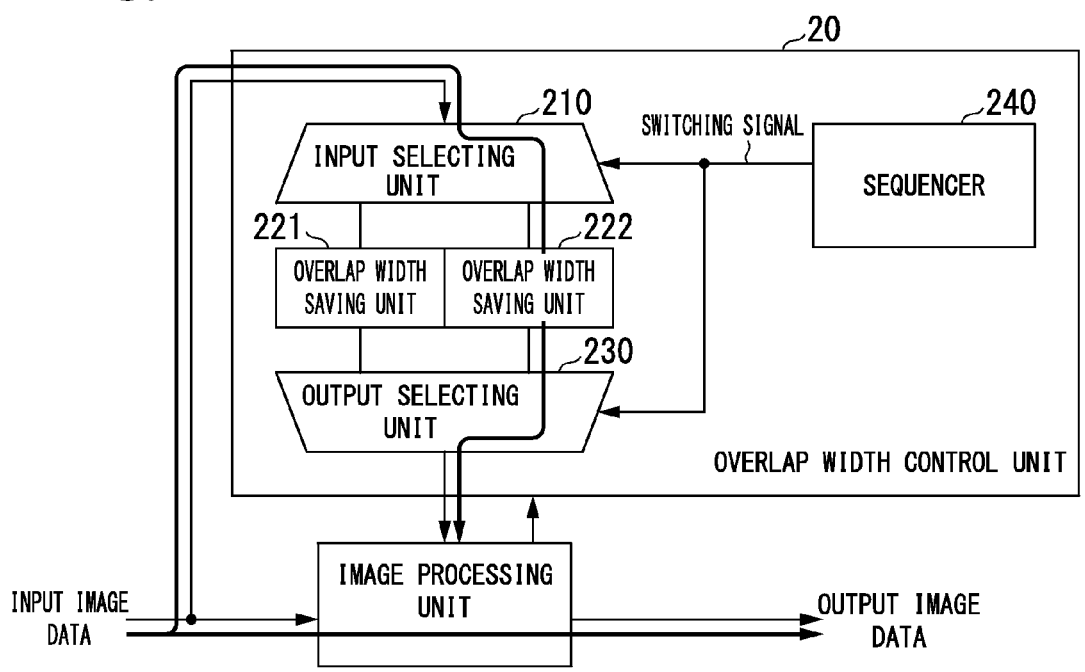

Here, a flow of image data when the image processing apparatus 1 of the first embodiment performs image processing will be described. FIGS. 2A and 2B are diagrams each illustrating a flow of image data in the image processing apparatus 1 of this first embodiment. In FIG. 2A, a flow of image data when the image processing apparatus 1 performs image processing to generate a live view image is schematically illustrated. In FIG. 2B, a flow of image data when the image processing apparatus 1 performs image processing to generate a still image is schematically illustrated.

First, the flow of the image data when the image processing apparatus 1 performs the image processing to generate the live view image will be described with reference to FIG. 2A. When the image processing apparatus 1 performs the image processing to generate the live view image, image data of one frame acquired from the image sensor according to the live view photography is sequentially input as input image data to the image processing section 10 and the overlap width control section 20 for every block. Then, initially, the overlap width control section 20 sequentially saves the input image data to be used when the image processing section 10 performs the live view processing of a first block, that is, overlap width data of the first block, within the input image data which has been input, in the overlap width saving section 221.

Subsequently, when image data of a first block of one frame acquired from the image sensor according to the live view photography is sequentially input as input image data to the image processing section 10 and the overlap width control section 20, the overlap width control section 20 sequentially outputs the overlap width data of the first block saved in the overlap width saving section 221 to the image processing section 10. Then, the image processing section 10 performs the live view processing on the image data of the first block based on the overlap width data of the first block sequentially input from the overlap width control section 20 and the input image data which has been sequentially input, and outputs image data after the live view processing has been performed as output image data of the first block. At this time, the overlap width control section 20 sequentially saves the input image data to be used when the image processing section 10 performs the live view processing of a second block, that is, overlap width data of the second block, within the input image data which has been sequentially input, in the overlap width saving section 221.

Subsequently, when image data of the second block of the one frame acquired from the image sensor according to the live view photography is sequentially input as input image data to the image processing section 10 and the overlap width control section 20, the overlap width control section 20 sequentially outputs overlap width data of the second block saved in the overlap width saving section 221 to the image processing section 10. Then, the image processing section 10 performs the live view processing on the image data of the second block based on the overlap width data of the second block sequentially input from the overlap width control section 20 and the input image data which has been sequentially input, and outputs image data after the live view processing has been performed as output image data of the second block. At this time, the overlap width control section 20 sequentially saves input image data to be used when the image processing section 10 performs the live view processing of a third block, that is, overlap width data of the third block, within the input image data which has been sequentially input, in the overlap width saving section 221.

Thereafter, likewise, every time image data of each block of one frame acquired from the image sensor according to the live view photography is input, the overlap width control section 20 iterates an operation of outputting overlap width data saved in the overlap width saving section 221 to the image processing section 10 and an operation of saving overlap width data (input image data) of the next block to be used when the image processing section 10 performs the spatial filtering process in the overlap width saving section 221. In addition, every time image data of each block of one frame acquired from the image sensor according to the live view photography is input, the image processing section 10 iterates the live view processing on the image data of the block to be currently processed based on overlap width data of a block to be currently processed input from the overlap width control section 20 and the input image data which has been input and an output of output image data of the currently processed block.

Thereby, when the image processing apparatus 1 performs image processing to generate the live view image, the live view processing on the image data of one frame acquired from the image sensor according to the live view photography is performed for every block.

Subsequently, a flow of image data when the image processing apparatus 1 performs image processing to generate a still image will be described with reference to FIG. 2B. When the image processing apparatus 1 performs the image processing to generate the still image, image data of one frame acquired from the image sensor according to the still image photography is sequentially input as input image data to the image processing section 10 and the overlap width control section 20 for every block. Then, initially, the overlap width control section 20 sequentially saves input image data to be used when the image processing section 10 performs still image processing of a first block, that is, overlap width data of the first block, within the input image data which has been input, in the overlap width saving section 222.

Subsequently, when image data of a first block of one frame acquired from the image sensor according to the still image photography is sequentially input as input image data to the image processing section 10 and the overlap width control section 20, the overlap width control section 20 sequentially outputs overlap width data of the first block saved in the overlap width saving section 222 to the image processing section 10. Then, the image processing section 10 performs still image processing on image data of the first block based on overlap width data of the first block sequentially input from the overlap width control section 20 and the input image data which has been sequentially input, and outputs image data after the still image processing has been performed as output image data of the first block. At this time, the overlap width control section 20 sequentially saves input image data to be used when the image processing section 10 performs the still image processing of a second block, that is, overlap width data of the second block, within the input image data which has been sequentially input, in the overlap width saving section 222.

Subsequently, when image data of the second block of the one frame acquired from the image sensor according to the still image photography is sequentially input to the image processing section 10 and the overlap width control section 20 as input image data, the overlap width control section 20 sequentially outputs overlap width data of the second block saved in the overlap width saving section 222 to the image processing section 10. Then, the image processing section 10 performs still image processing on image data of the second block based on the overlap width data of the second block sequentially input from the overlap width control section 20 and the input image data which has been sequentially input, and outputs image data after the still image processing has been performed as output image data of the second block. At this time, the overlap width control section 20 sequentially saves input image data to be used when the image processing section 10 performs the still image processing of a third block, that is, overlap width data of the third block, within the input image data which has been sequentially input, in the overlap width saving section 222.

Thereafter, likewise, every time image data of each block of one frame acquired from the image sensor according to the still image photography is input, the overlap width control section 20 iterates an operation of outputting overlap width data saved in the overlap width saving section 222 to the image processing section 10 and an operation of saving overlap width data (input image data) of the next block to be used when the image processing section 10 performs the spatial filtering process in the overlap width saving section 222. In addition, every time image data of each block of one frame acquired from the image sensor according to the still image photography is input, the image processing section 10 iterates the still image processing on the image data of the block to be currently processed based on overlap width data of a block to be currently processed input from the overlap width control section 20 and the input image data which has been input and an output of output image data of the currently processed block.

Thereby, when the image processing apparatus 1 performs image processing to generate the still image, the still image processing on the image data of one frame acquired from the image sensor according to the still image photography is performed for every block.

Figure 3:
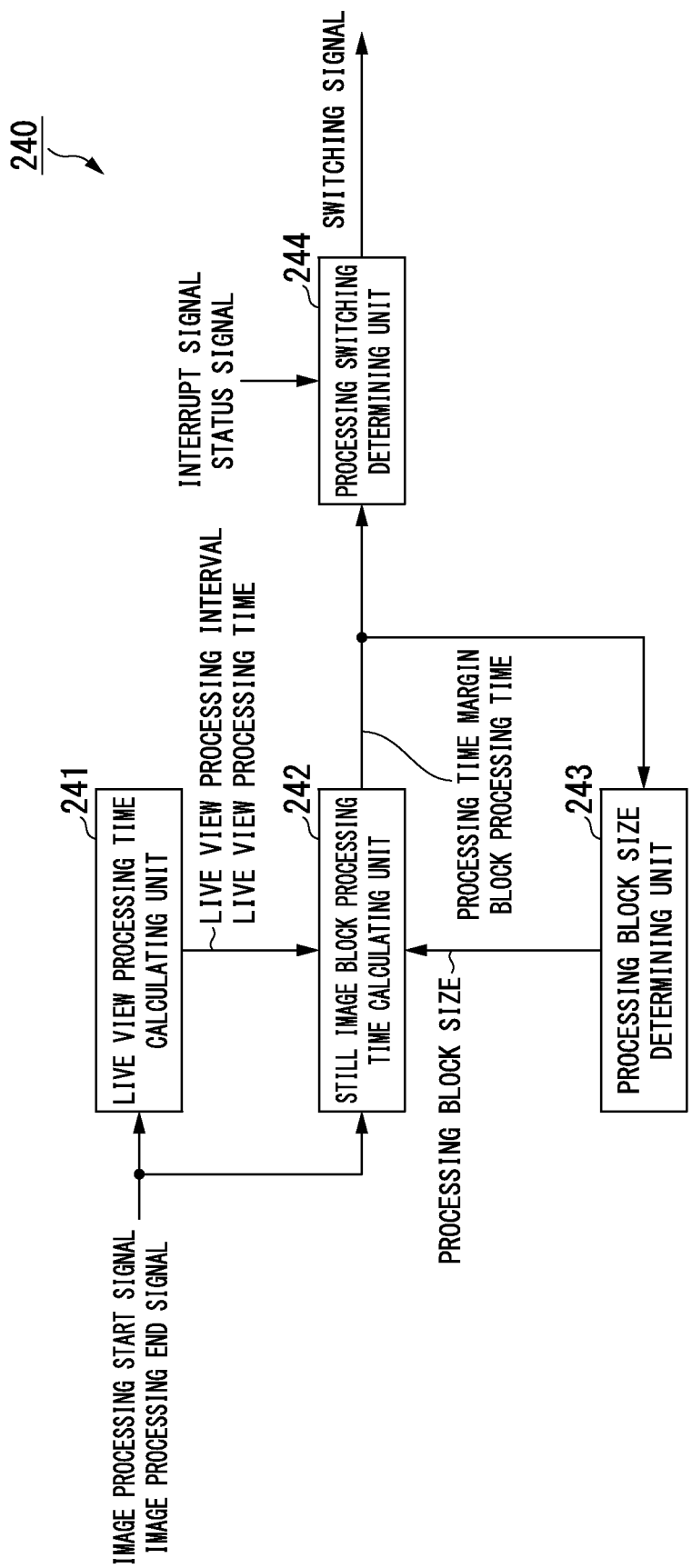
FIG. 3 is a block diagram illustrating a schematic configuration of a sequencer provided in the image processing apparatus of this first embodiment.

Next, the configuration and operation of the sequencer 240 provided in the image processing apparatus 1 of this first embodiment will be described. FIG. 3 is a block diagram illustrating a schematic configuration of the sequencer 240 provided in the image processing apparatus 1 of this first embodiment. The sequencer 240 illustrated in FIG. 3 includes a live view processing time calculating section 241, a still image block processing time calculating section 242, a processing block size determining section 243, and a processing switching determining section 244.

The live view processing time calculating section 241 calculates a processing time related to generation of a live view image by the image processing section 10 based on a signal (hereinafter referred to as an "image processing start signal") representing a start of the spatial filtering process and a signal (hereinafter referred to as an "image processing end signal") representing an end of the spatial filtering process input from the image processing section 10. Then, the live view processing time calculating section 241 outputs information about the calculated processing time related to the generation of the live view image to the still image block processing time calculating section 242.

More specifically, the live view processing time calculating section 241 calculates an interval (hereinafter referred to as a "live view processing interval") of live view processing (LV processing) of each frame acquired from the image sensor according to the live view photography by counting the number of cycles between image processing start signals of the live view processing input from the image processing section 10 as illustrated in FIG. 4A. In addition, as illustrated in FIG. 4B, the live view processing time calculating section 241 calculates a processing time (hereinafter referred to as a "live view processing time") necessary for live view processing (LV processing) of each frame by counting the number of cycles from the image processing start signal of the live view processing to the image processing end signal of the live view processing.

Also, the live view processing time calculating section 241 calculates a live view processing interval or a live view processing time for each frame acquired from the image sensor according to the live view photography. That is, every time image data of one frame is acquired from the image sensor according to the live view photography, the live view processing time calculating section 241 iterates an operation of calculating the live view processing interval or the live view processing time. However, without outputting information about live view processing intervals or live view processing times calculated for all frames to the still image block processing time calculating section 242, the live view processing time calculating section 241 outputs a maximum value or an average value of each of the live view processing intervals and the live view processing times calculated from the respective frames up to the current time as information about the live view processing interval and the live view processing time to the still image block processing time calculating section 242.

The still image block processing time calculating section 242 calculates a processing time related to still image generation by the image processing section 10 based on the image processing start signal of the spatial filtering process input from the image processing section 10 and information about the live view processing interval and the live view processing time input from the live view processing time calculating section 241. Then, the live view processing time calculating section 241 outputs information about the calculated processing time related to the still image generation to the processing block size determining section 243 and the processing switching determining section 244.

More specifically, the still image block processing time calculating section 242 calculates a time (hereinafter referred to as a "processing time margin") in which the image processing section 10 can perform still image processing while the live view processing is performed based on information about the live view processing interval and the live view processing time input from the live view processing time calculating section 241. More specifically, the still image block processing time calculating section 242 calculates a time of a difference between the live view processing interval and the live view processing time as the processing time margin as illustrated in FIG. 5A.

Also, in the calculation of the processing time margin after the still image photography, the still image block processing time calculating section 242 calculates a time from the image processing start signal of the still image processing input from the image processing section 10 to the image processing start signal by which live view processing of a frame acquired from the image sensor is started in initial live view photography after a frame of the still image has been acquired from the image sensor according to the still image photography as the processing time margin as illustrated in FIG. 5B.

In addition, based on information about a size of one block on which the image processing section 10 performs the still image processing, the still image block processing time calculating section 242, for example, calculates a processing time (hereinafter referred to as a "block processing time") of the still image processing to be performed by the image processing section 10 on one block by assuming that the still image processing on one piece of input image data included in the block is completed in one cycle. Also, the size of one block on which the image processing section 10 performs the still image processing is predetermined. However, when information (hereinafter referred to as a "processing block size") representing the size of the one block is input from the processing block size determining section 243, the still image block processing time calculating section 242 calculates the block processing time in a similar approach based on information about the processing block size input from the processing block size determining section 243.

Then, the still image block processing time calculating section 242 sequentially outputs information about the calculated processing time margin and block processing time to the processing block size determining section 243 and the processing switching determining section 244.

Also, every time image data of one frame is acquired from the image sensor according to the live view photography, the live view processing time calculating section 241 iterates the calculation of the live view processing interval or the live view processing time. That is, every time image data of one frame is acquired from the image sensor according to the live view photography, information about the live view processing interval or the live view processing time is updated. Accordingly, the still image block processing time calculating section 242 also iterates the calculation of the processing time margin and the block processing time every time the image data of the one frame is acquired from the image sensor according to the live view photography.

Based on the information about the processing time margin and the block processing time input from the still image block processing time calculating section 242, the processing block size determining section 243 determines whether the still image processing of at least one block has ended within a time of one processing time margin. When the determination result indicates that the still image processing of at least one block has not ended within the time of one processing time margin, the processing block size determining section 243 determines a block size in which the still image processing of at least one block has ended within the time of one processing time margin by reducing a size of one block. At this time, the processing block size determining section 243 determines a processing block size so that the block size is reduced by reducing the number of pieces of input image data of a vertical direction (longitudinal direction) of the block, that is, the number of lines of the input image data included in the block without changing the number of pieces of input image data of a horizontal direction (transversal direction) of the block. Then, the processing block size determining section 243 outputs information about the processing block size representing a size of the determined block to the still image block processing time calculating section 242.

Also, when the determination result indicates that there is a sufficient margin in a time of one processing time margin, that is, when it is determined that still image processing of a plurality of blocks within the time of the one processing time margin has definitely ended, the processing block size determining section 243 can be configured to determine the block size (processing block size) so that the size of one block increases. At this time, the processing block size determining section 243 determines a processing block size to increase the size of one block by increasing the number of pieces of input image data (the number of lines) of the vertical direction (longitudinal direction) of the block without changing the number of pieces of input image data of the horizontal direction (transversal direction) of the block. By determining the processing block size in this manner, it is possible to change the size of the block even when the storage capacity of the overlap width saving section 222 is not changed according to the block size. This is because the number of pieces (the number of lines) of the input image data of the vertical direction (longitudinal direction) included in the overlap width data saved in the overlap width saving section 222 is the fixed number of lines even when the number of lines of the input image data of the vertical direction (longitudinal direction) of the block is changed to save only the overlap width data in the overlap width saving section 222 in the overlap width control section 20.

Based on the information about the processing time margin and the block processing time input from the still image block processing time calculating section 242 and the information representing the status of the spatial filtering process input from the image processing section 10, the processing switching determining section 244 switches an overlap width saving section which saves the input image data which has been input as overlap width data and outputs the saved overlap width data to the image processing apparatus 1 to either of the overlap width saving sections 221 and 222.

Figure 6:
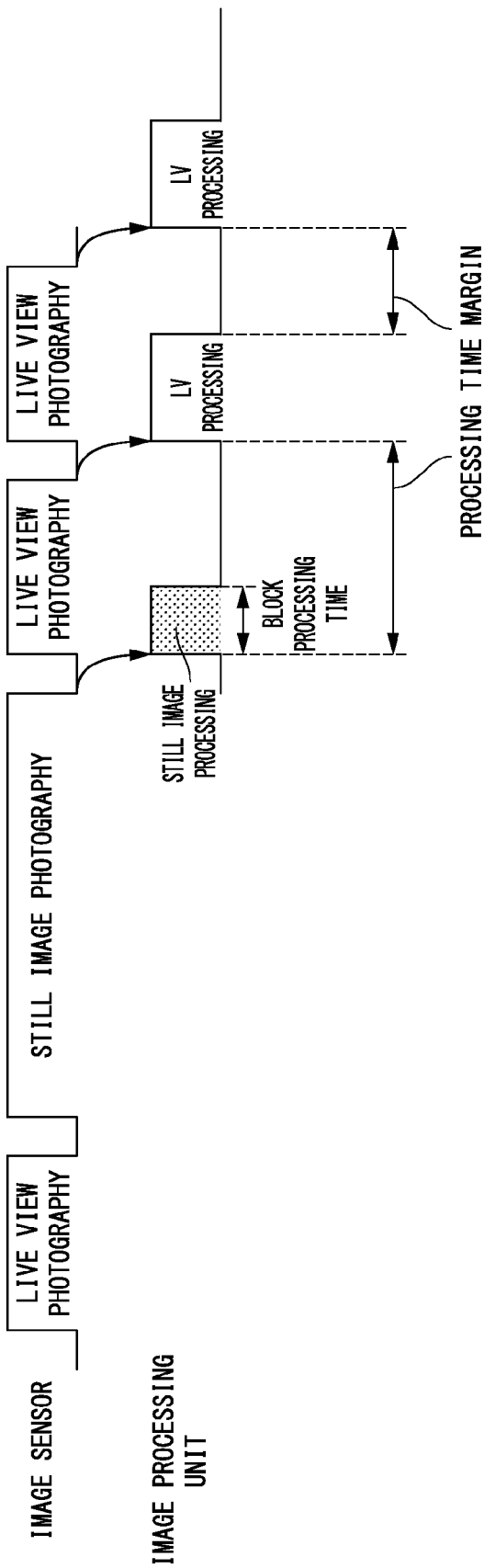
FIG. 6 is a timing chart illustrating the method of calculating the processing time using the sequencer provided in the image processing apparatus of this first embodiment.

More specifically, the processing switching determining section 244 compares the processing time margin and the block processing time, determines that it is possible to perform still image processing of a block within the time of the processing time margin when the time of the processing time margin is longer than the block processing time, and outputs a switching signal for performing switching to the overlap width saving section 222 which saves and outputs overlap width data for use in the still image processing as illustrated in FIG. 6. Thereby, the image processing section 10 can perform still image processing on image data of a block based on overlap width data of the block sequentially input from the overlap width saving section 222 provided in the overlap width control section 20 and the input image data which has been sequentially input.

In addition, when a status signal representing that the image processing section 10 performs the live view processing is input as information representing the status of the spatial filtering process, the processing switching determining section 244 outputs a switching signal for performing switching to the overlap width saving section 221 which saves and outputs overlap width data for use in the live view processing. Thereby, the image processing section 10 can perform the live view processing based on overlap width data sequentially input from the overlap width saving section 221 provided in the overlap width control section 20 and the input image data which has been sequentially input.

Also, when an interrupt signal representing that still image processing of one block has ended is input from the image processing section 10, the processing switching determining section 244 sets a time obtained by subtracting the block processing time from the processing time margin input from the still image block processing time calculating section 242 as a new processing time margin, and compares the new processing time margin to the block processing time. As a result, as illustrated in FIG. 7A, when it is determined that there is sufficient time until the image processing section 10 starts the live view processing, that is, that there is time for the image processing section 10 to perform the still image processing of the next block, the switching signal for performing switching to the overlap width saving section 222 is continuously output. Thereby, as illustrated in FIG. 7B, the image processing section 10 can perform the still image processing on image data of the next block based on overlap width data of the next block sequentially input from the overlap width saving section 222 provided in the overlap width control section 20 and the input image data which has been sequentially input. That is, the image processing section 10 can continuously perform the still image processing of two blocks. Thereafter, likewise, the processing switching determining section 244 updates the processing time margin every time the interrupt signal representing the end of the still image processing of one block is input from the image processing section 10, and continuously performs the still image processing of the block until a result obtained by comparing the updated processing time margin to the block processing time indicates that there is no time for the image processing section 10 to perform the still image processing of the next block.

In this manner, as illustrated in FIG. 7C, the processing switching determining section 244 iterates the switching for either of the overlap width saving sections 221 and 222 which saves and outputs the overlap width data until the still image processing on all blocks included in one frame acquired from the image sensor according to the still image photography is completed. That is, the processing switching determining section 244 iterates the switching of the overlap width saving section 221 or 222 until the image processing section 10 completes the still image generation and the interrupt signal representing that the still image processing has been completed is input from the image processing section 10. In this case, because overlap width data for use in the still image processing of a block to be currently processed is already saved in the switched overlap width saving section 222 when the still image processing of a previous block is performed, it is not necessary to set an area of a block including the overlap width area as an area of a block to be currently processed.

As described above, the calculation of the live view processing interval and the live view processing time by the live view processing time calculating section 241 and the calculation of the processing time margin and the block processing time by the still image block processing time calculating section 242 are iterated every time image data of one frame is acquired from the image sensor according to the live view photography. This is because the live view processing time or the block processing time of each frame is not a fixed time due to the congestion of a data bus when another component within the imaging apparatus equipped with the image processing apparatus 1 performs processing. Thus, as illustrated in FIG. 7C, the number of times of the still image processing performed by the image processing section 10 within the time of one processing time margin, that is, the number of blocks on which the still image processing is performed, differs according to each processing time margin. However, because the processing block size determining section 243 determines the size of the block so that the still image processing of at least one block ends within the time of one processing time margin as described above, the still image processing of at least one block ends within the time of one processing time margin.

Through this configuration, the sequencer 240 performs switching between the overlap width saving sections 221 and 222 which are divided into the use for saving the overlap width data for use in the live view processing and the use for saving the overlap width data for use in the still image processing according to a status of the spatial filtering process to be performed by the image processing section 10. Thereby, in the image processing apparatus 1 of this first embodiment, it is possible to easily resume the still image processing from a continuous block without considering the overlap width area of the next block because the overlap width data of the overlap width area for use in still image processing of the next block is already saved even when the live view processing is performed by stopping the still image processing midway.

Figure 8:
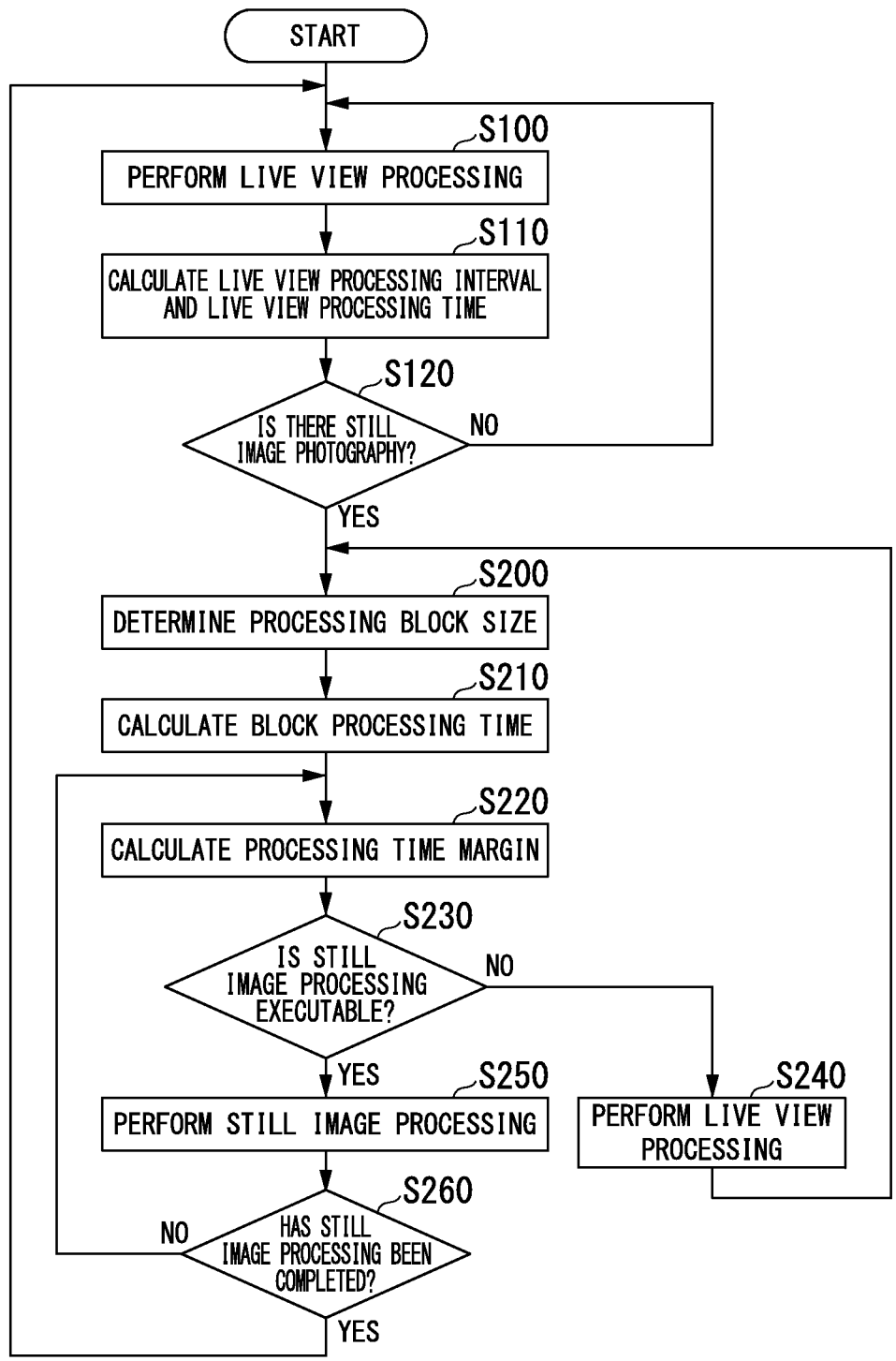
FIG. 8 is a flowchart illustrating a procedure of an operation in which the image processing apparatus of this first embodiment performs image processing.

Next, a procedure when the image processing apparatus 1 of this first embodiment performs image processing will be described. FIG. 8 is a flowchart illustrating a procedure of an operation in which the image processing apparatus 1 of this first embodiment performs image processing. In the live view processing, as in the still image processing, the image processing apparatus 1 divides an image of one frame acquired from the image sensor according to the live view photography into a plurality of blocks and performs the live view processing on each division block. However, in the live view processing, no still image processing is performed while the live view processing on an image of one frame is performed. That is, in the image processing apparatus 1, the live view processing on all blocks included in one frame is performed without stopping processing until the live view processing on the image of one frame is completed. In the description of the flowchart in which the image processing apparatus 1 performs image processing illustrated in FIG. 8, the image processing apparatus 1, which divides an image of one frame acquired from the image sensor according to the still image photography into a plurality of blocks and processes the plurality of blocks only when performing the still image processing, will be described. That is, the image processing apparatus 1, which processes an image of one frame as one block without dividing an image of one frame acquired from the image sensor according to the live view photography into a plurality of blocks when performing the live view processing, will be described.

When the operation of the imaging apparatus equipped with the image processing apparatus 1 is started, the image processing section 10 first performs the live view processing on image data of one frame acquired from the image sensor according to the live view photography. Thereby, it is possible to display a live view image on the display device which is a display apparatus provided in the imaging apparatus.

Subsequently, in step S110, the live view processing time calculating section 241 calculates each of the live view processing interval and the live view processing time of the live view processing performed by the image processing section 10 in step S100 (see FIGS. 4A and 4B).

Subsequently, in step S120, the image processing apparatus 1 checks whether the still image photography has been performed in the imaging apparatus. When the still image photography is found not to have been performed in the check of step S120 ("NO" of step S120), the process returns to step S100 and therefore the live view processing by the image processing section 10 on the image data of the next one frame acquired from the image sensor according to the live view photography and a processing time of the live view processing by the live view processing time calculating section 241 are iterated.

Also, while the processes of steps S100 and S110 are iterated, the live view processing time calculating section 241 updates information about the live view processing interval and the live view processing time of the live view processing performed by the image processing section 10 up to the current time. In addition, the still image block processing time calculating section 242 updates information about the processing time margin by calculating the processing time margin based on the updated information about the live view processing interval and the live view processing time (see FIGS. 5A and 5B). In addition, the processing block size determining section 243 determines a processing block size when a still image is processed based on information about the updated processing time margin and a current block processing time. In addition, the still image block processing time calculating section 242 updates the information about the block processing time by calculating the block processing time based on the updated processing block size.

In addition, when the still image photography is found to have been performed in the check of step S120 ("YES" of step S120), the processing block size determining section 243 determines the processing block size when the still image is processed based on information about the current processing time margin and the current block processing time in step S200.

Subsequently, in step S210, the still image block processing time calculating section 242 calculates the block processing time based on the current processing block size. In addition, in step S220, the still image block processing time calculating section 242 calculates the processing time margin based on the information about the current live view processing interval and the current live view processing time (see FIGS. 5A and 5B).

Subsequently, in step S230, the processing switching determining section 244 compares the processing time margin to the block processing time, and determines whether the still image processing can be performed. When a result of the determination of step S230 indicates that the still image processing is not performed ("NO" of step S230), the image processing section 10 performs the live view processing on image data of the next one frame acquired from the image sensor according to the live view photography in step S240. Thereby, it is possible to display the next live view image on the display device provided in the imaging apparatus. Then, the process returns to step S200.

In addition, when the determination result of step S230 indicates that the still image processing is performed ("YES" of step S230), the processing switching determining section 244 performs switching to the overlap width saving section 222 which saves and outputs the overlap width data for use in the still image processing in step S250. Then, the image processing section 10 performs the still image processing on image data of a first block of one frame acquired from the image sensor according to the still image photography.

Subsequently, in step S260, the processing switching determining section 244 checks whether the image processing section 10 has completed the still image processing on image data of all blocks included in the one frame acquired from the image sensor according to the still image photography. When a result of the check of step S260 indicates that the still image processing has not been completed on all the blocks ("NO" of step S260), the process returns to step S220 in which the processing switching determining section 244 calculates a new processing time margin (see FIGS. 6, 7A, 7B, and 7C). Then, an operation is iterated according to a determination of whether it is possible to perform the still image processing in step S230.

In addition, when the check result of step S260 indicates that the still image processing on all the blocks has been completed ("YES" of step S260), the processing switching determining section 244 performs switching to the overlap width saving section 221 which saves and outputs the overlap width data for use in the live view processing. Then, the process returns to step S100 in which the image processing section 10 performs the live view processing on image data of the next one frame acquired from the image sensor according to the live view photography. Thereby, it is possible to display the next live view image on the display device provided in the imaging apparatus.

Figure 9A:
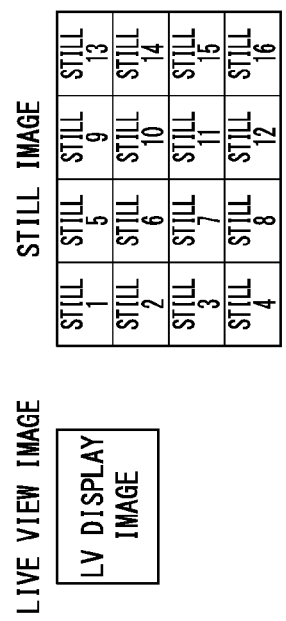
FIGS. 9A, 9B, and 9C are timing charts each illustrating an example of the operation in which the image processing apparatus of this first embodiment performs image processing.
Figure 9B:
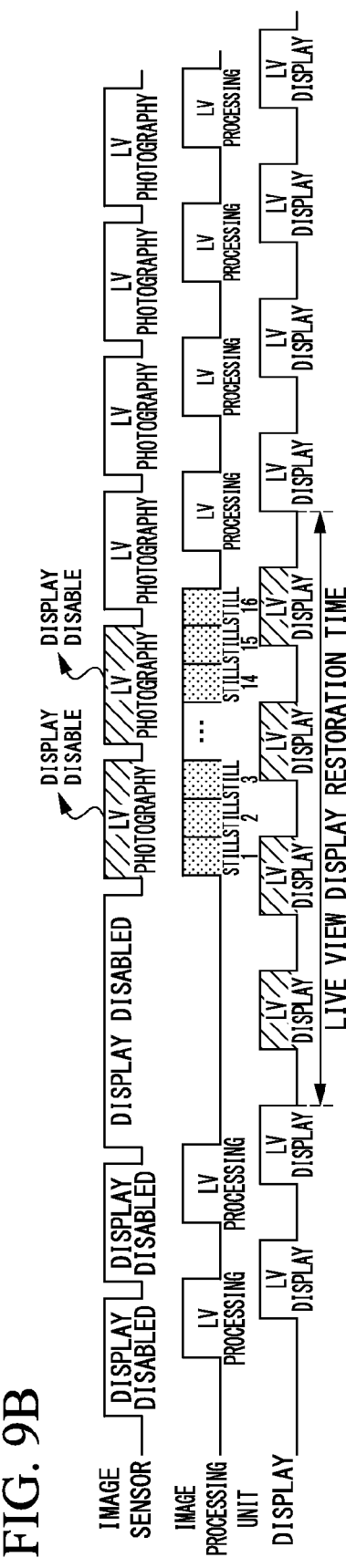
Figure 9C:
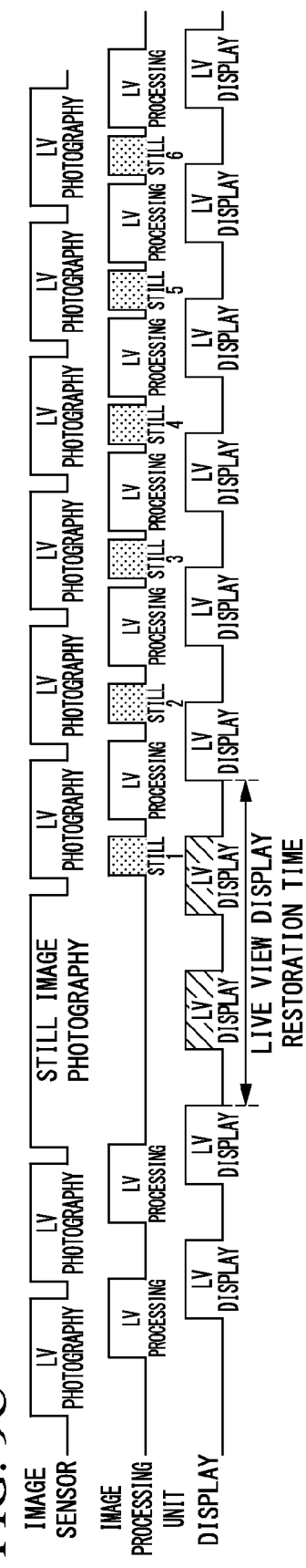

Here, an example of the operation in which the image processing apparatus 1 of this first embodiment performs image processing will be described. FIGS. 9A, 9B, and 9C are timing charts each illustrating an example of the operation in which the image processing apparatus 1 of this first embodiment performs the image processing. In FIG. 9A, a range of image data on which the image processing apparatus 1 performs the image processing is illustrated. In FIG. 9B, an example of a timing chart when the image processing apparatus of the related art performs the image processing is illustrated. In FIG. 9C, an example of the timing chart when the image processing apparatus 1 performs the image processing is illustrated on the lower side.

As described above, in the live view processing, as in the still image processing, the image processing apparatus 1 divides an image of one frame acquired from the image sensor according to the live view photography into a plurality of blocks and performs the live view processing on each division block. However, as described above, in the live view processing, the live view processing is performed on all blocks included in the one frame without performing the still image processing while the live view processing is performed on an image of one frame, that is, without stopping a process until the live view processing on an image of one frame is completed. In the description of the operation timing of the image processing illustrated in FIGS. 9B and 9C, as illustrated in FIG. 9A, the case in which a live view image is generated by performing the live view processing using an image of one frame acquired from the image sensor according to the live view photography as one block and a still image is generated by dividing the image of one frame acquired from the image sensor into 16 blocks according to the still image photography and performing the still image processing on the still image will be described.

As illustrated in FIG. 9B, in the imaging apparatus equipped with one image processing apparatus of the related art, it is difficult to perform the live view processing before the still image processing on image data of all blocks included in one frame acquired from the image sensor according to the still image photography is completed. Thus, it is difficult to display the live view image on the display device provided in the imaging apparatus before the image processing apparatus completes the still image processing. That is, it is difficult to restore (resume) a display of the live view image.

On the other hand, in the imaging apparatus equipped with the image processing apparatus 1, as illustrated in FIG. 9C, it is possible to perform the still image processing of each block of one frame acquired from the image sensor according to the still image photography during a period of a processing time margin in which the live view processing is not performed. Thereby, in the imaging apparatus equipped with the image processing apparatus 1, it is possible to display the live view image on the display device provided in the imaging apparatus even in a status in which the still image processing is not completed on image data of all blocks. That is, it is possible to promptly restore (resume) the display of the live view image.

As described above, in the image processing apparatus 1 of this first embodiment, the overlap width saving sections 221 and 222 separately save the overlap width data for use in the live view processing and the overlap width data for use in the still image processing. That is, the overlap width saving section which saves the overlap width data is individually provided for the live view processing and the still image processing. Then, the sequencer 240 performs switching between the overlap width saving sections 221 and 222 according to a status of the spatial filtering process performed by the image processing section 10. Thereby, in the image processing apparatus 1 of this first embodiment, processing of each block in the still image processing can be performed in a period in which no live view processing is performed, that is, in a gap of the live view processing. Then, in the image processing apparatus 1 of this first embodiment, it is possible to easily resume still image processing from a continuous block even when the live view processing is performed by stopping the still image processing of the next block in the step in which the still image processing of up to the middle block has ended. Thereby, in the imaging apparatus equipped with the image processing apparatus 1 of this first embodiment, even when the still image has been captured while the live view image of each frame is displayed on the display device according to the live view function, it is possible to promptly restore (resume) a display of the live view image after the still image photography and capture the next still image without missing a photo opportunity.

Also, although the case in which two overlap width saving sections of the overlap width saving sections 221 and 222 within the overlap width control section 20 have been provided in the image processing apparatus 1 of this first embodiment has been described, the overlap width saving section provided within the overlap width control section 20 is not limited to only the configuration of this first embodiment. The same consideration apply when more overlap width saving sections are configured to be provided within the overlap width control section 20.

Second Embodiment

Figure 10:
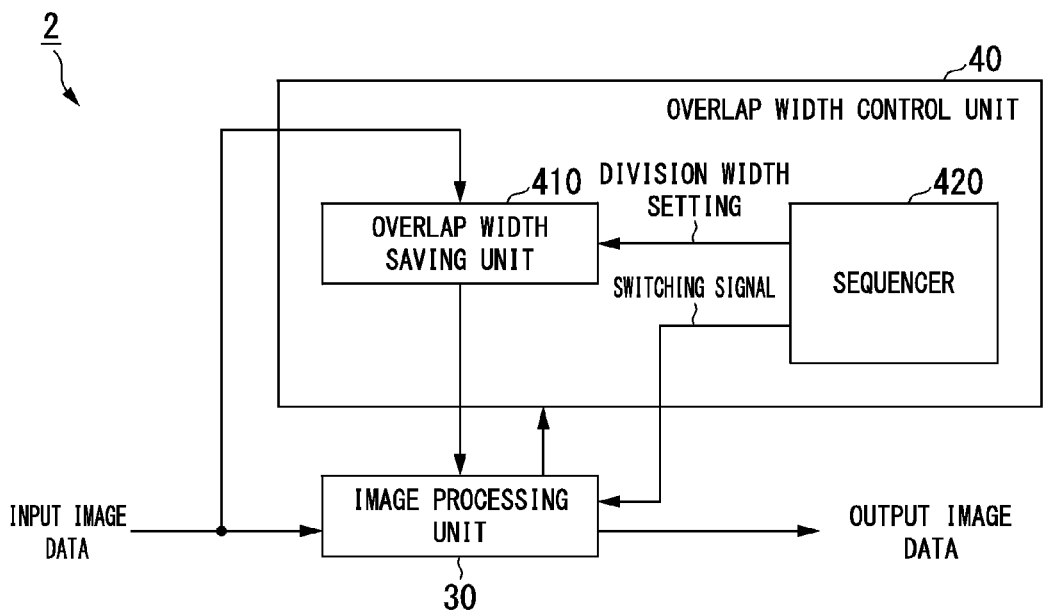
FIG. 10 is a block diagram illustrating a schematic configuration of an image processing apparatus in a second embodiment of the present invention.

Next, the second embodiment of the image processing apparatus of the present invention will be described. FIG. 10 is a block diagram illustrating a schematic configuration of the image processing apparatus in this second embodiment. The image processing apparatus 2 illustrated in FIG. 10 includes an image processing section 30 and an overlap width control section 40. Like the image processing apparatus 1 of the first embodiment, the image processing apparatus 2 performs various predetermined image processing on input image data which has been input and outputs output image data after the image processing. In the image processing apparatus 2, as in the image processing apparatus 1 of the first embodiment, an image of one frame is divided into a plurality of blocks and image processing is performed on each division block. When the image processing apparatus 2 performs a spatial filtering process such as a noise cancellation process or a low pass filtering process as in the image processing apparatus 1 of the first embodiment, the image processing is also performed using image data of an overlap width area necessary for the spatial filtering process in addition to image data of a block on which the image processing is performed. The image processing apparatus 2 will be described as an image processing apparatus which performs the spatial filtering process in the following description as well.

The image processing section 30 is an image processing section which performs the spatial filtering process on input image data input to the image processing apparatus 2. As in the image processing section 10 provided in the image processing apparatus 1 of the first embodiment, the image processing section 30 performs the live view processing for generating a live view image and the still image processing for generating a still image and outputs image data after the spatial filtering process has been performed as output image data after the image processing apparatus 2 has performed the spatial filtering process. In the spatial filtering process by the image processing section 30, as in the image processing section 10 provided in the image processing apparatus 1 of the first embodiment, processing of each block is performed in a state in which the input image data which has been input is combined with overlap width data input from the overlap width control section 40. However, according to a switching signal input from the overlap width control section 40, the image processing section 30 switches the overlap width data to be processed in combination with the input image data when the block processing is performed. In addition, as in the image processing section 10 provided in the image processing apparatus 1 of the first embodiment, the image processing section 30 outputs signals (image processing start and end signals) representing a start and an end of the spatial filtering process or information representing a status of the spatial filtering process to the overlap width control section 40. Also, in the following description, the detailed description of an operation when the image processing section 30 performs the operation similar to that of the image processing section 10 provided in the image processing apparatus 1 of the first embodiment will be omitted.

As in the overlap width control section 20 provided in the image processing apparatus 1 of the first embodiment, the overlap width control section 40 temporarily stores overlap width data to be used when the image processing section 30 performs the spatial filtering process and outputs the stored overlap width data to the image processing section 30. In addition, the overlap width control section 40 outputs a switching signal for switching overlap width data for use in the spatial filtering process by the image processing section 30 to the image processing section 30. The overlap width control section 40 includes an overlap width saving section 410 and a sequencer 420.

The overlap width saving section 410 is a storage section for example, including an SRAM or the like which temporarily stores (saves) image data of an overlap width area to be used when the image processing section 30 performs the spatial filtering process from among input image data input to the image processing apparatus 2. The overlap width saving section 410 has a storage capacity capable of saving both overlap width data necessary in one block on which the image processing section 30 performs live view processing and overlap width data necessary in one block on which the image processing section 30 performs still image processing. Then, a storage area of the overlap width saving section 410 is dynamically divided into an area (hereinafter referred to as a "live view display area") in which the overlap width data is stored for use in the live view processing by the image processing section 30 and an area (hereinafter referred to as a "still image recording area") in which the overlap width data for use in the still image processing is saved. In the following description, reference signs are assigned to the overlap width data saving areas into which the storage area is divided within the overlap width saving section 410, and will be described as the live view display area 411 and the still image recording area 412. The overlap width saving section 410 outputs the overlap width data saved in the live view display area 411 and the still image recording area 412 to the image processing section 30.

The sequencer 420 calculates a processing time when the image processing section 30 performs the spatial filtering process based on image processing start and end signals input from the image processing section 30. Then, the sequencer 420 sets a size of the saving area of each of the live view display area 411 and the still image recording area 412, that is, a division width for dynamically dividing the storage capacity of the overlap width saving section 410, based on each calculated processing time by the image processing section 30. In addition, based on the information representing each calculated processing time by the image processing section 30 and the status of the spatial filtering process, the sequencer 420 switches an area (the live view display area 411 or the still image recording area 412) in which the input image data input to the image processing apparatus 2 is saved as the overlap width data. Also, a configuration of the sequencer 420, a method by which the sequencer 420 determines a size of each saving area, and a method by which the sequencer 420 performs switching to a saving area of a saving destination of the overlap width data will be described in detail later.

Figure 11A:
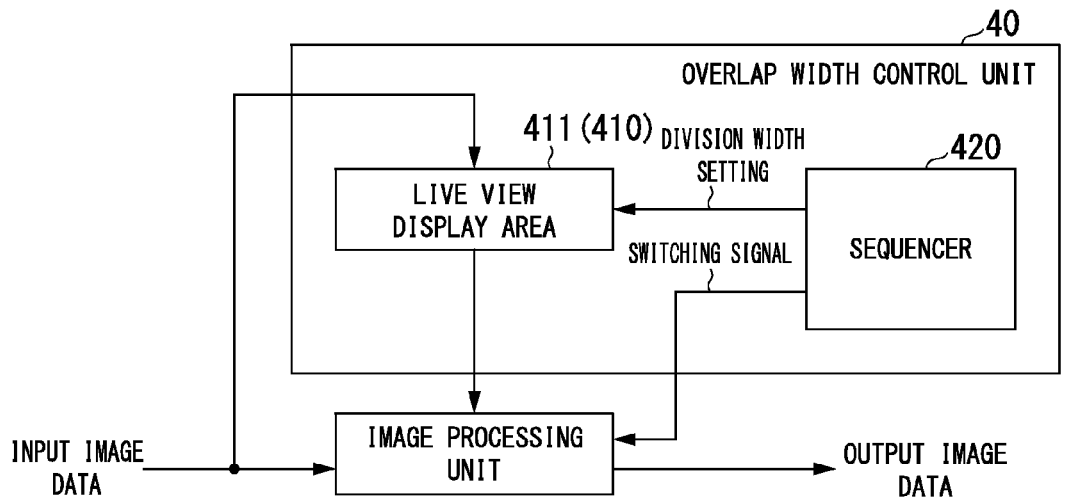
FIGS. 11A and 11B are diagrams each illustrating a saving area of overlap width data set by a sequencer provided in an image processing apparatus of this second embodiment.
Figure 11B:
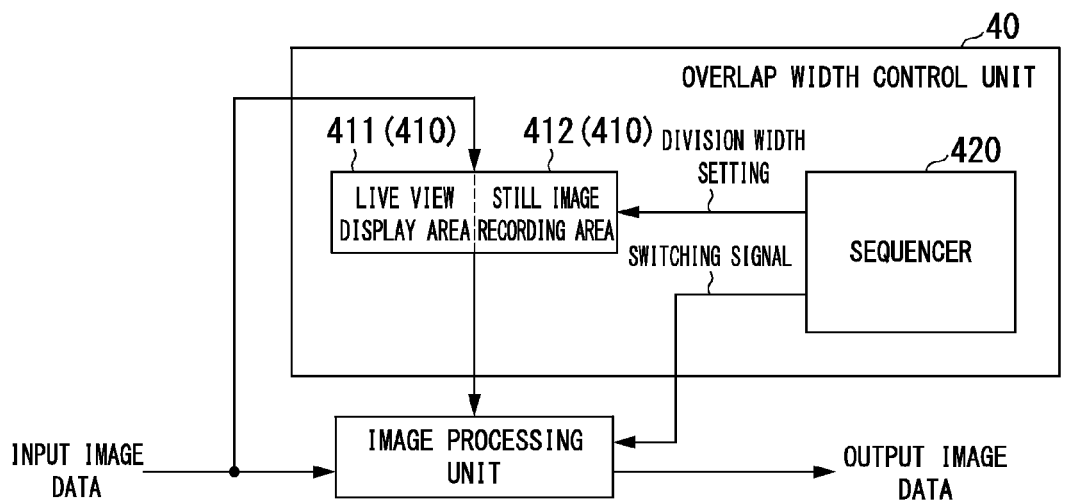

Next, a division width setting process of the overlap width saving section 410 when the image processing apparatus 2 of this second embodiment performs image processing will be described. FIGS. 11A and 11B are diagrams each illustrating a saving area of overlap width data set by the sequencer 420 provided in the image processing apparatus 2 of this second embodiment. In FIG. 11A, an example in which the overlap width saving section 410 is divided when the image processing apparatus 2 performs image processing to generate a live view image is schematically illustrated. In FIG. 11B, an example in which the overlap width saving section 410 is divided when the image processing apparatus 2 performs the image processing to generate the live view image and the image processing to generate the still image is schematically illustrated.

When the image processing section 30 performs only the live view processing, the sequencer 420 sets the division width so that all saving areas of the overlap width saving section 410 are allocated as the live view display area 411 as illustrated in FIG. 11A. Thereby, even when the image data of one frame acquired from the image sensor according to the live view photography is divided into a larger block, the overlap width control section 40 can save overlap width data for use in the live view processing in the live view display area 411. Thereby, the image processing section 30 can perform the live view processing in a small number of blocks.

In addition, when the image processing section 30 performs the live view processing and the still image processing, the sequencer 420 sets the division width so that the saving area of the overlap width saving section 410 is divided into two, one division saving area is set as the live view display area 411, and the other division saving area is set as the still image recording area 412 as illustrated in FIG. 11B. Thereby, the overlap width control section 40 can save the overlap width data for use in the live view processing on image data of one frame acquired from the image sensor according to the live view photography in the live view display area 411 and save the overlap width data for use in the still image processing on image data of one frame acquired from the image sensor according to the still image photography in the still image recording area 412. Thereby, the image processing section 30 can easily resume the still image processing from a continuous block even when the live view processing is performed by stopping the still image processing midway.

In the operations of the live view processing and the still image processing to be performed by the image processing section 30, it is possible to consider a process of replacing the overlap width saving section 221 with the live view display area 411 and replacing the overlap width saving section 222 with the still image recording area 412 in the image processing apparatus 1 of the first embodiment. Accordingly, detailed description related to the operations of the live view processing and the still image processing to be performed by the image processing section 30 will be omitted.

Figure 12A:
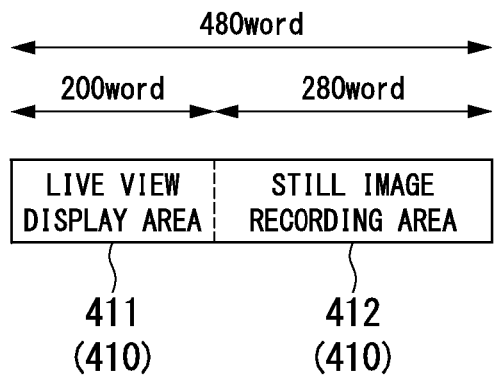
FIGS. 12A, 12B, and 12C are diagrams each illustrating an example of a size of the saving area of the overlap width data set by a sequencer provided in the image processing apparatus of this second embodiment.
Figure 12B:
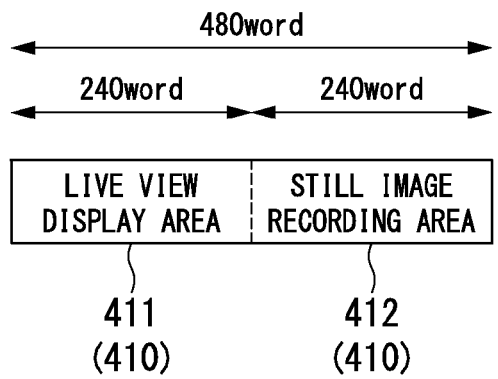
Figure 12C:
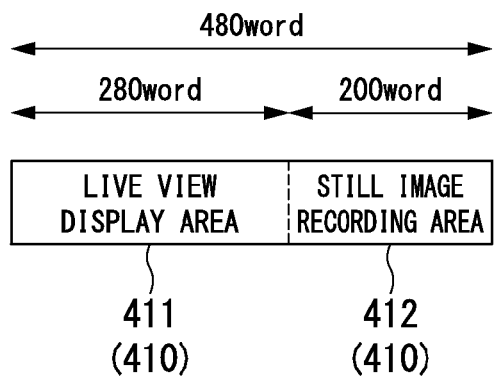

Here, a method by which the sequencer 420 determines sizes of the live view display area 411 and the still image recording area 412 into which the storage area of the overlap width saving section 410 is divided will be described. FIGS. 12A, 12B, and 12C are diagrams each illustrating an example of a size of the saving area of the overlap width data set by the sequencer 420 provided in the image processing apparatus 2 of this second embodiment. In FIGS. 12A, 12B, and 12C, an example in which the storage capacity of the overlap width saving section 410 is 480 words is illustrated.

As described above, the sequencer 420 dynamically divides the storage capacity of each of the live view display area 411 and the still image recording area 412 based on each calculated processing time by the image processing section 30. More specifically, the sequencer 420 dynamically divides the storage capacity of each of the live view display area 411 and the still image recording area 412 based on a live view processing interval and a live view processing time of the live view processing performed by the image processing section 30.

The sequencer 420 compares the calculated live view processing interval and live view processing time, and sets the division width so that the live view display area 411 is decreased and the still image recording area 412 is increased when the live view processing time of the live view processing performed by the image processing section 30 has a sufficient margin for the live view processing interval. In FIG. 12A, an example in which the live view display area 411 is set to 200 words and the still image recording area 412 is set to 280 words is illustrated.

In addition, the sequencer 420 compares the calculated live view processing interval and live view processing time, and sets the division width so that the live view display area 411 and the still image recording area 412 have equal sizes when the live view processing time of the live view processing performed by the image processing section 30 has a margin for the live view processing interval. In FIG. 12B, an example in which the live view display area 411 is set to 240 words and the still image recording area 412 is set to 240 words, that is, the storage area of the overlap width saving section 410 is set to be divided into two equal parts, is illustrated.

In addition, the sequencer 420 compares the calculated live view processing interval and live view processing time, and sets the division width so that the live view display area 411 is increased and the still image recording area 412 is decreased when the live view processing time of the live view processing performed by the image processing section 30 has a small margin for the live view processing interval. In FIG. 12C, an example in which the live view display area 411 is set to 280 words and the still image recording area 412 is set to 200 words is illustrated.

In this manner, the sequencer 420 sets the division width in which the overlap width saving section 410 is divided based on the calculated live view processing interval and live view processing time. Thereby, the still image processing by the image processing section 30 can be performed during a period in which the live view processing is not performed while the live view processing by the image processing section 30 is reliably performed, that is, while a display of a live view image by a live view function of the display device provided in the imaging apparatus is secured.

Also, a method by which the sequencer 420 determines a margin of the live view processing time for the live view processing interval, for example, a method of making the determination by presetting several threshold values for the live view processing time and comparing each predetermined threshold value to the live view processing time, is considered. However, the method of determining the margin of the live view processing time for the live view processing interval is not limited at all.

Figure 13:
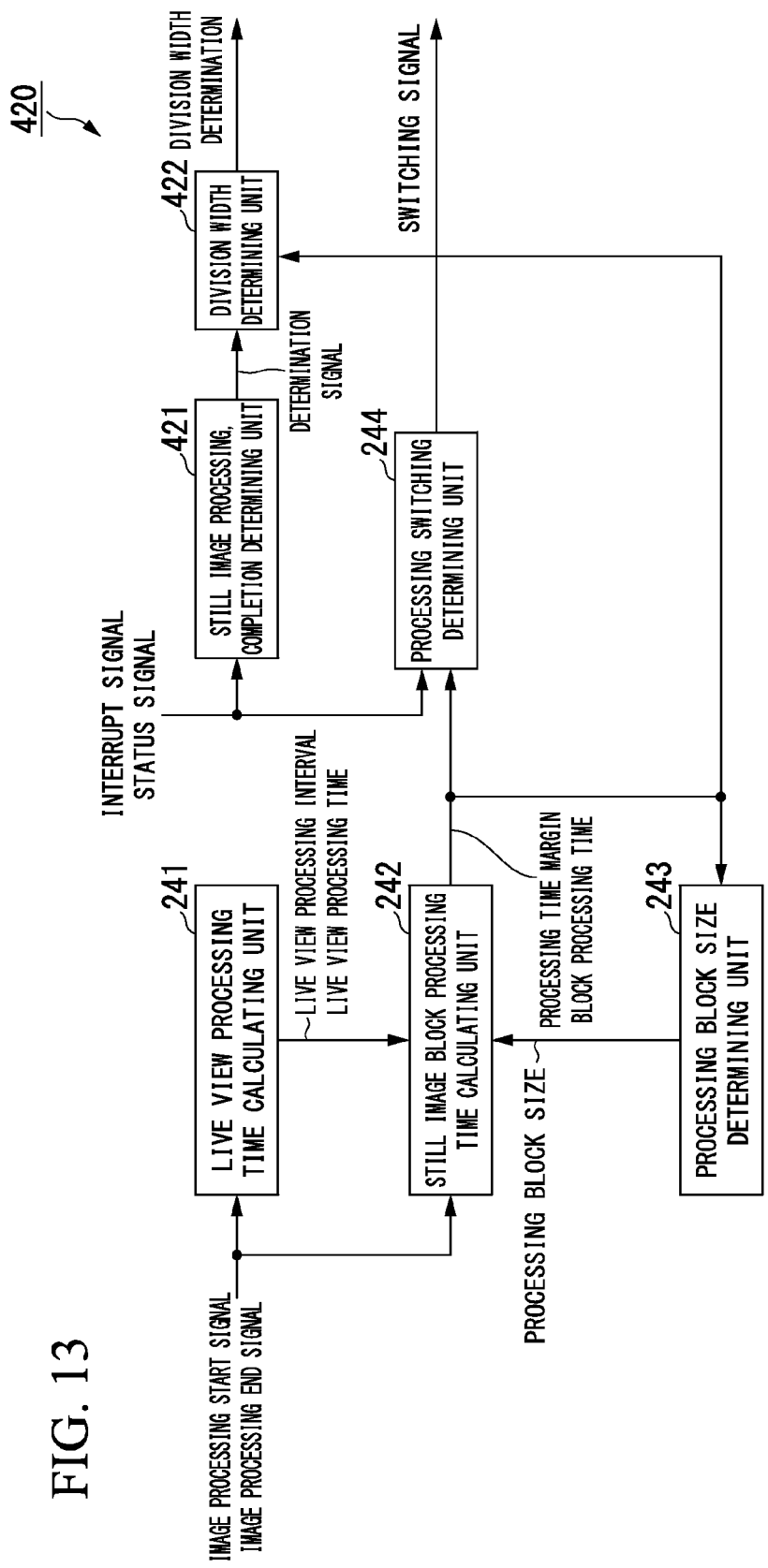
FIG. 13 is a block diagram illustrating a schematic configuration of the sequencer provided in the image processing apparatus of this second embodiment.

Next, the configuration and operation of the sequencer 420 provided in the image processing apparatus 2 of this second embodiment will be described. FIG. 13 is a block diagram illustrating a schematic configuration of the sequencer 420 provided in the image processing apparatus 2 of this second embodiment. The sequencer 420 illustrated in FIG. 13 includes a live view processing time calculating section 241, a still image block processing time calculating section 242, a processing block size determining section 243, a processing switching determining section 244, a still image processing completion determining section 421, and a division width determining section 422.

Also, the sequencer 420 is a configuration in which the still image processing completion determining section 421 and the division width determining section 422 are added to the sequencer 240 within the overlap width control section 20 provided in the image processing apparatus 1 of the first embodiment, and the other components are similar to the components of the sequencer 240 of the first embodiment. However, the still image block processing time calculating section 242 also sequentially outputs information about the calculated processing time margin and block processing time to the division width determining section 422 in addition to the processing block size determining section 243 and the processing switching determining section 244. Accordingly, the same components as those of the sequencer 240 of the image processing apparatus 1 of the first embodiment are assigned and detailed description related to the operation will be omitted.

Based on the interrupt signal representing that the still image processing has been completed input from the image processing section 30, the still image processing completion determining section 421 determines whether the still image processing has been completed for all blocks included in one frame acquired from the image sensor according to the still image photography. Then, the still image processing completion determining section 421 outputs a determination signal representing the determination result to the division width determining section 422.

Based on the determination signal input from the still image processing completion determining section 421 and information about a processing time margin and a block processing time input from the still image block processing time calculating section 242, the division width determining section 422 determines the division width for dividing the storage capacity of the overlap width saving section 410 into the live view display area 411 and the still image recording area 412. Then, the division width determining section 422 sets the determined division width for the overlap width saving section 410.

Through this configuration, the sequencer 420 performs switching between the live view display area 411 in which the overlap width data for use in the live view processing is saved and the still image recording area 412 in which the overlap width data for use in the still image processing is saved according to a status of the spatial filtering process performed by the image processing section 30. Thereby, in the image processing apparatus 2 of this second embodiment, as in the image processing apparatus 1 of this first embodiment, it is possible to easily resume the still image processing from a continuous block even when the live view processing is performed by stopping the still image processing midway.

Also, based on the interrupt signal representing that the still image processing of one block input from the image processing section 30 has ended, the still image processing completion determining section 421 may be configured to determine whether the still image processing on the block of the vertical direction (longitudinal direction) in one frame acquired from the image sensor according to the still image photography has been completed. In this case, for example, as illustrated in FIG. 14, the division width determining section 422 can set the still image recording area 412 of a different width in an adjacent block in the horizontal direction (transversal direction) in one frame acquired from the image sensor according to the still image photography. Thereby, the image processing section 30 can perform still image processing in a state in which a size of a block generated by dividing one frame is further increased. Then, the still image processing by the image processing section 30 can be performed in a small number of blocks and the still image processing can be completed earlier. Also, the adjacent block in the vertical direction (longitudinal direction) in one frame sets the still image recording area 412 of the same width. This is because a partition position of a block is different when the still image recording area 412 of a different width is set in an adjacent block in the vertical direction (longitudinal direction).

Figure 15:
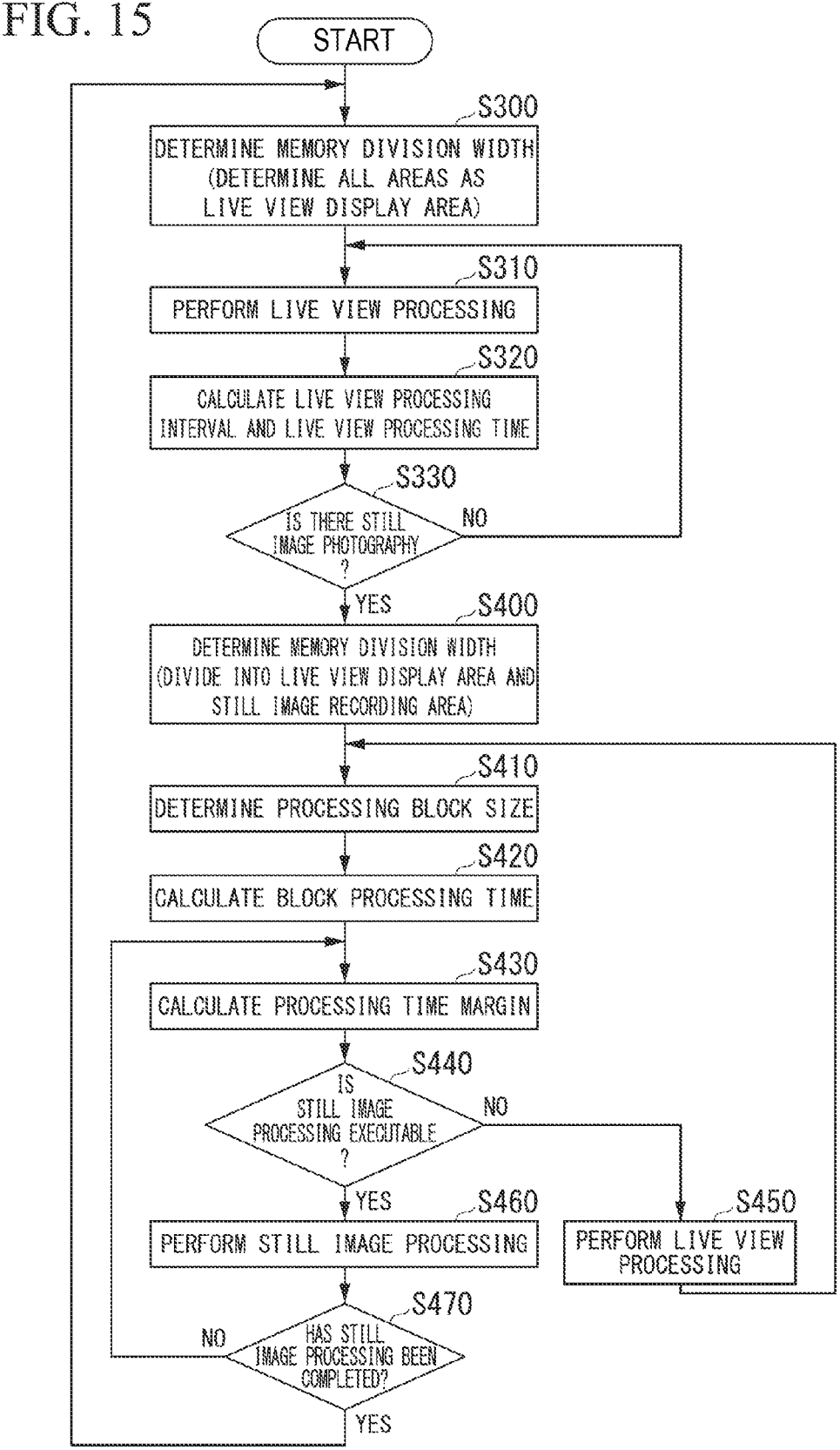
FIG. 15 is a flowchart illustrating a procedure of an operation in which the image processing apparatus of this second embodiment performs image processing.

Next, a procedure when the image processing apparatus 2 of this second embodiment performs image processing will be described. FIG. 15 is a flowchart illustrating a procedure of an operation in which the image processing apparatus 2 of this second embodiment performs image processing. Like the image processing apparatus 1, the image processing apparatus 2 divides an image of one frame acquired from the image sensor according to the live view photography into a plurality of blocks and performs the live view processing on each division block in the live view processing as in the still image processing. However, like the image processing apparatus 1, the image processing apparatus 2 also performs live view processing on all blocks included in one frame without performing still image processing while the live view processing is performed on an image of one frame, that is, without stopping processing until the live view processing for an image of one frame is completed. In the description of the flowchart in which the image processing apparatus 2 performs image processing illustrated in FIG. 15, as in the description of the flowchart in the image processing apparatus 1 of the first embodiment illustrated in FIG. 8, the image processing apparatus 2 which divides an image of one frame into a plurality of divisions to process the plurality of divisions only when performing still image processing and processes an image of one frame as one block when performing live view processing will be described.

When an operation of the imaging apparatus equipped with the image processing apparatus 2 is started, the division width determining section 422 first determines the division width so that all saving areas of the overlap width saving section 410 are allocated as the live view display area 411 and sets the determined division width for the overlap width saving section 410 in step S300. In addition, the processing switching determining section 244 outputs a switching signal representing that the overlap width data of the live view display area 411 is used in the live view processing to the image processing section 30.

Subsequently, in step S310, the image processing section 30 performs the live view processing on image data of one frame acquired from the image sensor according to the live view photography. Thereby, it is possible to display the live view image on the display device provided in the imaging apparatus.

Subsequently, in step S320, the live view processing time calculating section 241 calculates each of the live view processing interval and the live view processing time of the live view processing performed by the image processing section 30 in step S310 (see FIGS. 4A and 4B).

Subsequently, in step S330, the image processing apparatus 2 checks whether still image photography has been performed in the imaging apparatus. When the still image photography is found not to have been performed in the check of step S330 ("NO" of step S330), the process returns to step S310 and therefore the live view processing by the image processing section 30 on the image data of the next one frame acquired from the image sensor according to the live view photography and the calculation of the processing time of the live view processing by the live view processing time calculating section 241 are iterated.

Also, in the image processing apparatus 2, an operation while the processes of steps S310 and S320 are iterated is similar to that in the image processing apparatus 1 of the first embodiment. That is, the live view processing time calculating section 241 updates information about the live view processing interval and the live view processing time of the live view processing performed by the image processing section 30 up to the current time, and the still image block processing time calculating section 242 updates information about the processing time margin by calculating the processing time margin based on the updated information about the live view processing interval and the live view processing time (see FIGS. 5A and 5B). In addition, the processing block size determining section 243 determines a processing block size when a still image is processed based on information about the updated processing time margin and a current block processing time, and the still image block processing time calculating section 242 updates the information about the block processing time by calculating the block processing time based on the updated processing block size.

In addition, when the still image photography has been performed in the check of step S330 ("YES" of step S330), the division width determining section 422 determines the division width so that the saving area of the overlap width saving section 410 is divided into two of the live view display area 411 and the still image recording area 412 and the live view display area 411 and the still image recording area 412 are allocated, and sets the determined division width for the overlap width saving section 410 in step S400.

Subsequently, in step S410, the processing block size determining section 243 determines a processing block size when the still image processing is performed based on information about a current processing time margin and a current block processing time.

Subsequently, in step S420, the still image block processing time calculating section 242 calculates the block processing time based on the current processing block size. In addition, in step S430, the still image block processing time calculating section 242 calculates the processing time margin based on the information about the current live view processing interval and the current live view processing time (see FIGS. 5A and 5B).

Subsequently, in step S440, the processing switching determining section 244 compares the processing time margin to the block processing time, and determines whether the still image processing can be performed. When a result of the determination of step S440 indicates that the still image processing is not performed ("NO" of step S440), the processing switching determining section 244 outputs the switching signal representing that the overlap width data of the live view display area 411 is used in the live view processing to the image processing section 30 in step S450. Then, the image processing section 30 performs the live view processing on the image data of the next one frame acquired from the image sensor according to the live view photography using overlap width data saved in the live view display area 411 within the overlap width data input from the overlap width saving section 410. Thereby, it is possible to display the next live view image on the display device provided in the imaging apparatus. Then, the process returns to step S410.

In addition, when the determination result of step S440 indicates that the still image processing can be performed ("YES" of step S440), the processing switching determining section 244 outputs a switching signal representing that the overlap width data of the still image recording area 412 is used in the still image processing to the image processing section 30 in step S460. Then, the image processing section 30 performs the still image processing on the image data of a first block of one frame acquired from the image sensor according to the still image photography using overlap width data saved in the still image recording area 412 within the overlap width data input from the overlap width saving section 410.

Subsequently, in step S470, the processing switching determining section 244 checks whether the image processing section 30 has completed the still image processing on image data of all blocks included in the one frame acquired from the image sensor according to the still image photography. When a result of the check of step S470 indicates that the still image processing on all the blocks has not been completed ("NO" of step S470), the process returns to step S430 in which the processing switching determining section 244 calculates a new processing time margin (see FIGS. 6, 7A, 7B, and 7C). Then, an operation is iterated according to a determination of whether it is possible to perform the still image processing in step S440.

In addition, when the check result of step S470 indicates that the still image processing on all the blocks has been completed ("YES" of step S470), the process returns to step S300 in which the division width determining section 422 determines the division width so that all saving areas of the overlap width saving section 410 are allocated as the live view display area 411, and sets the determined division width for the overlap width saving section 410. In addition, the processing switching determining section 244 outputs the switching signal representing that the overlap width data of the live view display area 411 is used in the live view processing to the image processing section 30.

Then, in step S310, the image processing section 30 performs the live view processing on image data of the next one frame acquired from the image sensor according to the live view photography. Thereby, it is possible to display the next live view image on the display device provided in the imaging apparatus.

Through an operation procedure of the image processing by this image processing apparatus 2, in the imaging apparatus equipped with the image processing apparatus 2, as in the imaging apparatus equipped with the image processing apparatus 1 of the first embodiment, it is possible to perform the still image processing of each block of one frame acquired from the image sensor according to the still image photography during a period of a processing time margin in which no live view processing is performed (see FIGS. 9A, 9B, and 9C). Thereby, in the imaging apparatus equipped with the image processing apparatus 2, as in the imaging apparatus equipped with the image processing apparatus 1 of the first embodiment, it is also possible to promptly restore (resume) a display of the live view image on the display device provided in the imaging apparatus even in a state in which the still image processing is not completed on image data of all blocks.

As described above, in the image processing apparatus 2 of this second embodiment, overlap width data for use in the live view processing and overlap width data for use in the still image processing are separately saved in of the live view display area 411 and the still image recording area 412, respectively. Then, according to the status of the spatial filtering process performed by the image processing section 30, the sequencer 420 switches the overlap width data for use in the spatial filtering process to either the overlap width data saved in the live view display area 411 or the overlap width data saved in the still image recording area 412. Thereby, in the image processing apparatus 2 of this second embodiment, as in the image processing apparatus 1 of this first embodiment, processing of each block in the still image processing can be performed during a period in which no live view processing is performed, that is, in a gap of the live view processing. Then, in the image processing apparatus 2 of this second embodiment, as in the image processing apparatus 1 of this first embodiment, it is possible to easily resume still image processing from a continuous block even when the live view processing is performed by stopping the still image processing of the next block in the step in which the still image processing up to the middle block has ended. Thereby, in the imaging apparatus equipped with the image processing apparatus 2 of this second embodiment, as in the imaging apparatus equipped with the image processing apparatus 1 of the first embodiment, even when the still image has been captured while the live view image of each frame is displayed on the display device according to the live view function, it is possible to promptly restore (resume) a display of the live view image after the still image photography and capture the next still image without missing a photo opportunity.

In addition, in the image processing apparatus 2 of this second embodiment, the storage capacity of the overlap width saving section 410 is dynamically divided and a size of the saving area of each of the live view display area 411 and the still image recording area 412 is dynamically changed. Thereby, in the image processing apparatus 2 of this second embodiment, it is possible to perform an operation similar to the case in which the overlap width saving sections are individually provided for the live view processing and the still image processing without increasing the number of overlap width saving sections which save overlap width data.

As described above, according to a mode for carrying out the present invention, overlap width data for use in the live view processing and overlap width data for use in the still image processing are separately saved, and the overlap width data is switched so that the overlap width data for use in the live view processing and the overlap width data for use in the still image processing are exclusively used according to the status of the image processing by the image processing section. Thereby, in the imaging apparatus equipped with the image processing apparatus of the mode for carrying out the present invention, it is possible to perform image processing in which necessary data of an overlap width area is also used when the image processing is performed and generate a still image without decreasing the throughput of the image processing.

In addition, according to the mode for carrying out the present invention, because overlap width data for use in each processing operation is saved without being overwritten and deleted even when the live view processing and the still image processing are alternately performed, it is possible to switch the processing without decreasing the processing efficiency of each of the live view processing and the still image processing. Thus, in the imaging apparatus equipped with the image processing apparatus of the mode for carrying out the present invention, it is possible to easily resume still image processing from a continuous block even when the live view processing is performed by stopping the still image processing of the next block in the step in which the still image processing of up to the middle block has ended. Thereby, in the imaging apparatus equipped with the image processing apparatus of the mode for carrying out the present invention, even when the still image is captured while the live view image of each frame is displayed on the display device according to the live view function, it is possible to promptly restore (resume) a display of the live view image after the still image is captured. Thereby, in the imaging apparatus equipped with the image processing apparatus of the mode for carrying out the present invention, it is possible to implement an imaging apparatus capable of capturing the next still image without missing a photo opportunity.

In addition, according to the mode for carrying out the present invention, one image processing apparatus can perform image processing for generating a live view image and image processing for generating a still image. Thereby, in the imaging apparatus equipped with the image processing apparatus of the mode for carrying out the present invention, it is possible to generate the live view image and the still image without increasing a circuit scale or power consumption.

Although the case in which the image processing to be performed by the image processing apparatus is the spatial filtering process has been described in this embodiment, the image processing to be performed by the image processing apparatus is not limited to this mode for carrying out the present invention, and the idea of the present invention can be applied to any image processing as long as the image processing is performed using the overlap width data.

In addition, although the case in which the image processing to be performed by the image processing apparatus is the live view processing and the still image processing has been described in this embodiment, the image processing to be performed by the image processing apparatus is not limited to this mode for carrying out the present invention. For example, the image processing may be performed by combining various image processing modes considered to be performed by the image processing apparatus such as moving image processing to generate a moving image and the live view processing.

In addition, although the case of a configuration in which the sequencer is provided within the overlap width control section has been described in this embodiment, a position including the sequencer is not limited to this mode for carrying out the present invention. For example, in the image processing apparatus 1 illustrated in FIG. 1, the sequencer 240 is provided outside the overlap width control section 20. That is, in the image processing apparatus 1, the image processing section 10, the overlap width control section 20, and the sequencer 240 may be included.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An image processing apparatus comprising:
    an image processing section configured to receive input images of a plurality of frames, divide each of the input images of the frames that have been received into a plurality of blocks for each of the input images of the frames, and generate an image corresponding to each frame by performing predetermined image processing on each of the blocks that have been divided; and
    an overlap width control section configured to separately save overlap width data to be used in each of a plurality of image processing operations by the image processing section for generating the image corresponding to each frame for each piece of the overlap width data corresponding to each image processing operation when image data included in an overlap width area in which block areas overlap within the image of each frame is saved as overlap width data, and switch the overlap width data to be used when the image processing section performs each image processing operation,
    wherein the overlap width control section separately saves first overlap width data for use in first image processing by the image processing section for generating a first image corresponding to the image of each frame and second overlap width data for use in second image processing by the image processing section for generating a second image corresponding to an image of each frame, and switches the overlap width data to be used when the image processing section performs each image processing operation to either the first overlap width data or the second overlap width data.

2. The image processing apparatus according to claim 1, wherein
    the overlap width control section includes:
        a first overlap width saving section configured to save the first overlap width data;
        a second overlap width saving section configured to save the second overlap width data; and
        a sequencer configured to switch a saving destination of the overlap width data to either the first overlap width saving section or the second overlap width saving section and switch an output source of the overlap width data to be output to the image processing section to either the first overlap width saving section or the second overlap width saving section,
    the sequencer switches the saving destination and the output source of the overlap width data to the first overlap width saving section when the image processing section performs the first image processing, and
    the sequencer switches the saving destination and the output source of the overlap width data to the second overlap width saving section when the image processing section performs the second image processing.

3. The image processing apparatus according to claim 2, wherein
    the sequencer includes:
        a first processing time calculating section configured to calculate an image processing interval which is an interval at which the image processing section performs the first image processing on the image of each frame and an image processing time which is a time in which the image processing section performs the first image processing on the image of one frame;
        a second processing time calculating section configured to calculate an image processing time margin which is a time in which the image processing section is able to perform the second image processing based on the image processing interval and the image processing time and further calculate a block processing time which is a time in which the image processing section performs the second image processing on one block generated by dividing the image of one frame;
        a processing block size determining section configured to determine a block size in which the image processing section is able to perform the second image processing on at least one block within the image processing time margin based on the image processing time margin and the block processing time; and
        a processing switching determining section configured to switch the saving destination and the output source of the overlap width data based on the image processing time margin, the block processing time, and information representing a status of the second image processing by the image processing section.

4. The image processing apparatus according to claim 1, wherein
    the overlap width control section includes:
        an overlap width saving section configured to separately save the first overlap width data and the second overlap width data in different storage areas; and
        a sequencer configured to divide the storage area of the overlap width saving section into a first storage area in which the first overlap width data is saved and a second storage area in which the second overlap width data is saved, and control switching of the overlap width data to be used when the image processing section performs the image processing,
    the sequencer dynamically determines sizes of the first storage area and the second storage area within the overlap width saving section according to each image processing operation to be performed by the image processing section and divides the storage area into the first storage area and the second storage area based on the determined size of each storage area, and
    the sequencer controls switching of the overlap width data so that the first overlap width data saved in the first storage area is used when the image processing section performs the first image processing and the second overlap width data saved in the second storage area is used when the image processing section performs the second image processing.

5. The image processing apparatus according to claim 4, wherein
the sequencer includes:
a first processing time calculating section configured to calculate an image processing interval which is an interval at which the image processing section performs the first image processing on the image of each frame and an image processing time which is a time in which the image processing section performs the first image processing on the image of one frame;
a second processing time calculating section configured to calculate an image processing time margin which is a time in which the image processing section is able to perform the second image processing based on the image processing interval and the image processing time and further calculate a block processing time which is a time in which the image processing section performs the second image processing on one block generated by dividing the image of one frame;
a processing block size determining section configured to determine a block size in which the image processing section is able to perform the second image processing on at least one block within the image processing time margin based on the image processing time margin and the block processing time;
a processing switching determining section configured to control switching of the overlap width data to be used when the image processing section performs the image processing based on the image processing time margin, the block processing time, and information representing a status of the second image processing by the image processing section;
an image processing completion determining section configured to determine completion of the second image processing for the image of one frame based on the image processing time margin, the block processing time, and the information representing the status of the second image processing by the image processing section; and
a division width determining section configured to determine a division width in which the storage area of the overlap width saving section is divided into the first storage area and the second storage area based on a determination result of the completion of the second image processing by the image processing completion determining section, the image processing time margin, and the block processing time.

6. The image processing apparatus according to claim 1, wherein
the first image processing is image processing for a moving image display in which image data for displaying a moving image according to image data of each input frame on a display apparatus is generated, and
the second image processing is image processing for still image recording in which image data for recording a still image according to image data of the input frame is generated.

7. The image processing apparatus according to claim 1, wherein each of the first image processing and the second image processing is a spatial filtering process on image data of each input frame.

8. An image processing apparatus comprising:
an image processing section configured to receive input images of a plurality of frames, divide an image of each input frame into a plurality of blocks for each image of the frame, and generate an image corresponding to each frame by performing predetermined image processing on each division block;
an overlap width saving section configured to set image data included in an overlap width area in which block areas overlap within the image of each frame as overlap width data and separately save overlap width data to be used in each of a plurality of image processing operations by the image processing section for generating the image corresponding to each frame for each piece of the overlap width data corresponding to each image processing operation; and
a sequencer configured to switch the overlap width data to be used when the image processing section performs each image processing operation, wherein
the overlap width saving section separately saves first overlap width data for use in first image processing by the image processing section for generating a first image corresponding to the image of each frame and second overlap width data for use in second image processing by the image processing section for generating a second image corresponding to the image of each frame, and
the sequencer switches the overlap width data saved in the overlap width saving section output to the image processing section when the image processing section performs each image processing operation to either the first overlap width data or the second overlap width data.

9. The image processing apparatus according to claim 8, wherein
the overlap width saving section includes:
a first overlap width saving section configured to save the first overlap width data; and
a second overlap width saving section configured to save the second overlap width data,
the sequencer switches a saving destination and an output source of the overlap width data to the first overlap width saving section when the image processing section performs the first image processing, and
the sequencer switches the saving destination and the output source of the overlap width data to the second overlap width saving section when the image processing section performs the second image processing.

10. The image processing apparatus according to claim 9, wherein
the sequencer includes:
a first processing time calculating section configured to calculate an image processing interval which is an interval at which the image processing section performs the first image processing on the image of each frame and an image processing time which is a time in which the image processing section performs the first image processing on the image of one frame;
a second processing time calculating section configured to calculate an image processing time margin which is a time in which the image processing section is able to perform the second image processing based on the image processing interval and the image processing time and further calculate a block processing time which is a time in which the image processing section performs the second image processing on one block generated by dividing the image of one frame;
a processing block size determining section configured to determine a block size in which the image processing section is able to perform the second image processing on at least one block within the image processing time margin based on the image processing time margin and the block processing time; and a processing switching determining section configured to switch the saving destination and the output source of the overlap width data based on the image processing time margin, the block processing time, and information representing a status of the second image processing by the image processing section.

11. The image processing apparatus according to claim 8, wherein an overlap width saving section separately saves the first overlap width data and the second overlap width data in different storage areas, the sequencer dynamically determines sizes of a first storage area in which the first overlap width data within the overlap width saving section is saved and a second storage area in which the second overlap width data is saved according to each image processing operation to be performed by the image processing section and divides the storage area into the first storage area and the second storage area based on the determined size of each storage area, and the sequencer controls switching of the overlap width data so that the first overlap width data saved in the first storage area is used when the image processing section performs the first image processing and the second overlap width data saved in the second storage area is used when the image processing section performs the second image processing.

12. The image processing apparatus according to claim 11, wherein the sequencer includes:

a first processing time calculating section configured to calculate an image processing interval which is an interval at which the image processing section performs the first image processing on the image of each frame and an image processing time which is a time in which the image processing section performs the first image processing on the image of one frame;

a second processing time calculating section configured to calculate an image processing time margin which is a time in which the image processing section is able to perform the second image processing based on the image processing interval and the image processing time and further calculate a block processing time which is a time in which the image processing section performs the second image processing on one block generated by dividing the image of one frame;

a processing block size determining section configured to determine a block size in which the image processing section is able to perform the second image processing on at least one block within the image processing time margin based on the image processing time margin and the block processing time;

a processing switching determining section configured to control switching of the overlap width data to be used when the image processing section performs the image processing based on the image processing time margin, the block processing time, and information representing a status of the second image processing by the image processing section;

an image processing completion determining section configured to determine completion of the second image processing for the image of one frame based on the image processing time margin, the block processing time, and the information representing the status of the second image processing by the image processing section; and a division width determining section configured to determine a division width in which the storage area of the overlap width saving section is divided into the first storage area and the second storage area based on a determination result of the completion of the second image processing by the image processing completion determining section, the image processing time margin, and the block processing time.

13. The image processing apparatus according to claim 8, wherein the first image processing is image processing for a moving image display in which image data for displaying a moving image according to image data of each input frame on a display apparatus is generated, and the second image processing is image processing for still image recording in which image data for recording a still image according to image data of the input frame is generated.

14. The image processing apparatus according to claim 8, wherein each of the first image processing and the second image processing is a spatial filtering process on image data of each input frame.

\* \* \* \* \*